(12) United States Patent
Akieda et al.

(10) Patent No.: US 6,982,618 B2
(45) Date of Patent: Jan. 3, 2006

(54) ACTUATOR

(75) Inventors: Shinichiro Akieda, Shinagawa (JP); Takashi Arita, Shinagawa (JP); Shigemi Kurashima, Shinagawa (JP); Hiroto Inoue, Shinagawa (JP); Yuriko Nishiyama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 10/625,727

(22) Filed: Jul. 24, 2003

(65) Prior Publication Data
US 2005/0077165 A1    Apr. 14, 2005

(30) Foreign Application Priority Data
Oct. 25, 2002    (JP)    .............................. 2002-311580

(51) Int. Cl.
*H01F 7/08* (2006.01)
(52) U.S. Cl. ...................................... 335/222; 335/207
(58) Field of Classification Search .................... 335/1, 335/2, 229–234, 222; 345/161; 340/407.1, 340/407.2; 200/5 R, 6, 17 R, 18, 252
See application file for complete search history.

(56) References Cited

U.S. PATENT DOCUMENTS

| 5,327,162 A   | * | 7/1994  | Soma .......................... 345/161 |
| 6,816,049 B2  | * | 11/2004 | Watanabe et al. ............ 335/222 |
| 6,831,238 B1  | * | 12/2004 | Lau ............................. 200/6 A |
| 2004/0125082 A1 | * | 7/2004  | Akieda et al. ............... 345/156 |

FOREIGN PATENT DOCUMENTS

JP    2000-330688    11/2000

* cited by examiner

*Primary Examiner*—Lincoln Donovan
*Assistant Examiner*—Bernard Rojas
(74) *Attorney, Agent, or Firm*—Staas & Halsey LLP

(57) ABSTRACT

An actuator includes magnets that are arranged in a flat form, coils that face the magnets, a moving member that is connected to the coils, a first holding member that holds the moving member in such a manner that the moving member can slide within a predetermined range; and a second holding member that holds the first holding member in such a manner that the first holding member can slide within a predetermined range in a direction perpendicular to the sliding direction of the moving member. This actuator moves the coils against the magnets.

33 Claims, 30 Drawing Sheets

○ X DIRECTION
□ Y DIRECTION

ACTUATOR

BACKGROUND OF THE INVENTION

1. Field of the Invention

The present invention generally relates to an actuator equipped with a unit that faces secured magnets and moves against the secured magnets, and more particularly, to an actuator to be incorporated into a device such as a mouse used in conjunction with a personal computer.

2. Description of the Related Art

Conventionally, an actuator has coils that face magnets arranged in a flat form, and moves the coils against the magnets by controlling current supplied to the coils. Such an actuator is expected to serve as a novel device that supplies information from computers to operators. Japanese Unexamined Patent Publication No. 2000-330688 discloses this type of actuator.

The above actuator can be incorporated into a mouse used in conjunction with a personal computer. Conventionally, a mouse is used simply as an input device that is operated by an operator to input data into a computer. However, with the above actuator incorporated into a mouse, various types of information can be supplied to an operator through the actuator being vibrated by transmitting various signals from the computer to the mouse. In such a case, the conventional mouse can serve as a man-machine interface.

In a case where the above actuator is incorporated into a conventional device such as a mouse, however, it is necessary to keep enough space for magnets and coils. As the number of components increases, the structure becomes more complicated, and the assembling becomes more difficult. Furthermore, the production costs increase as those problems arise.

SUMMARY OF THE INVENTION

It is therefore an object of the present invention to provide an actuator in which the above disadvantage is eliminated.

A more specific object of the present invention is to provide an actuator that are small and easy to assemble, and can be smoothly incorporated into a conventional device.

The above objects of the present invention are achieved by an actuator comprising: magnets that are arranged in a flat form; coils that face the magnets; a moving member that is connected to the coils; a first holding member that holds the moving member in such a manner that the moving member can slide within a predetermined range; and a second holding member that holds the first holding member in such a manner that the first holding member can slide within a predetermined range in a direction perpendicular to the sliding direction of the moving member, the actuator moving the coils against the magnets.

The above objects of the present invention are also achieved by an actuator comprising: coils that are arranged in a flat form; magnets that face the coils; a moving member that is connected to the magnets; a first holding member that holds the moving member in such a manner that the moving member can slide within a predetermined range; and a second holding member that holds the first holding member in such a manner that the first holding member can slide within a predetermined range in a direction perpendicular to the sliding direction of the moving member, the actuator moving the coils against the magnets.

The above objects of the present invention are also achieved by an actuator comprising: magnets that are arranged in a flat form; coils that face the magnets; a moving member that is connected to the coils; a first guide member that guides the moving member in such a manner that the moving member can slide within a predetermined range; and a second guide member that guides the first guide member in such a manner that the first guide member can slide within a predetermined range in a direction perpendicular to the sliding direction of the moving member, the actuator moving the coils against the magnets.

The above objects of the present invention are also achieved by an actuator comprising: coils that are arranged in a flat form; magnets that face the coils; a moving member that is connected to the magnets; a first guide member that guides the moving member in such a manner that the moving member can slide within a predetermined range; and a second guide member that guides the first guide member in such a manner that the first guide member can slide within a predetermined range in a direction perpendicular to the sliding direction of the moving member, the actuator moving the magnets against the coils.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments of the present invention, with reference to the accompanying drawings.

Figure 1A:
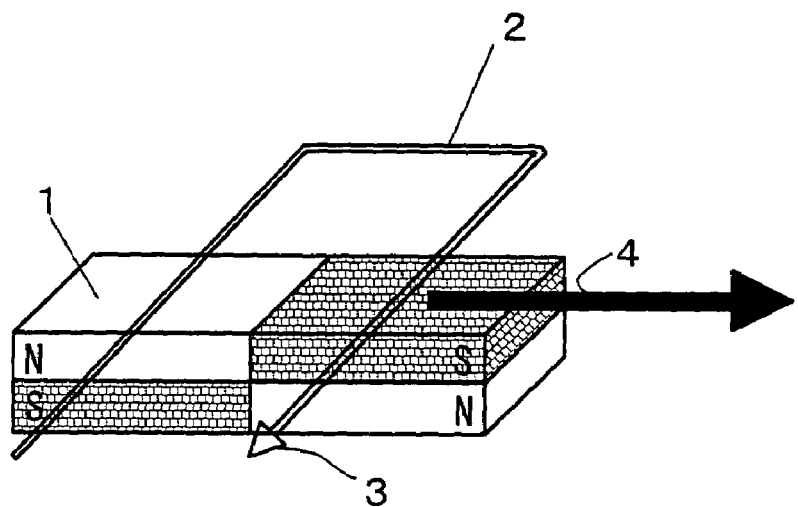
FIG. 1A illustrates the principles of the Fleming's left-hand rule.
Figure 1B:
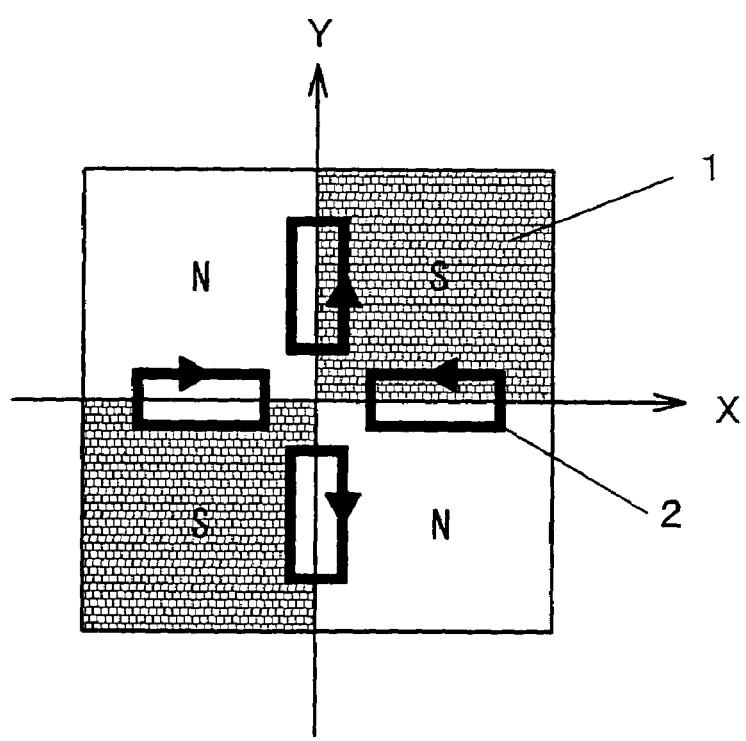
FIG. 1B is a schematic view of magnets and coils employed in the present invention.

First, the principles of the technique utilized in the embodiments of the present invention will be briefly described. FIGS. 1A and 1B illustrate the relationship between coils and magnets. The present invention is based on the Fleming's left-hand rule.

FIG. 1A illustrates the Fleming's left-hand rule. As can be seen from FIG. 1A, coils 2 are located in the vicinity of the magnets 1. When current 3 flows in the direction of the white arrow, a thrust force 4 acting in the direction of the black arrow is caused in the coils 2 on the basis of the Fleming's left-hand rule. FIG. 1B schematically illustrates the structure of magnets and coils employed in the embodiments of the present invention. As can be seen from FIG. 1B, coils 2 are arranged over magnets 1 that are arranged in a flat form, with the N-poles and S-poles being alternately located. These coils 2 are secured to a moving mechanism (not shown). The current to be supplied to the coils 2 is controlled so that the coils 2 can be moved two-dimensionally in the X-Y plane by virtue of the thrust force shown in FIG. 1A. The present invention provides an actuator that utilizes this structure.

Figure 2A:
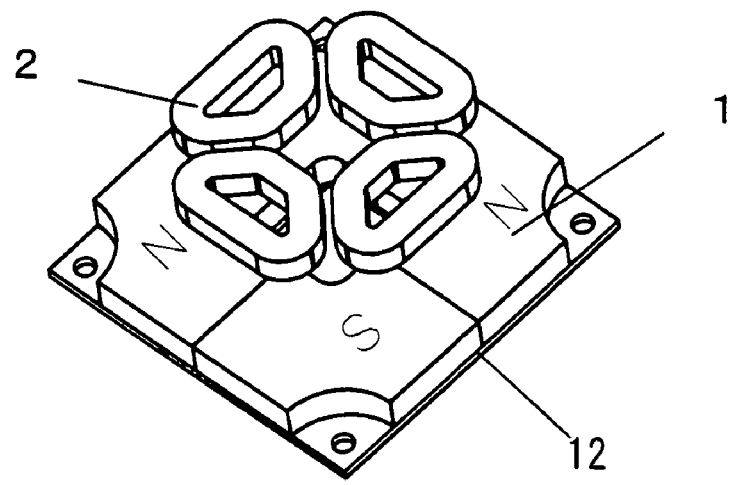
FIGS. 2A through 2C illustrate the structure of FIG. 1B in greater detail.
Figure 2B:
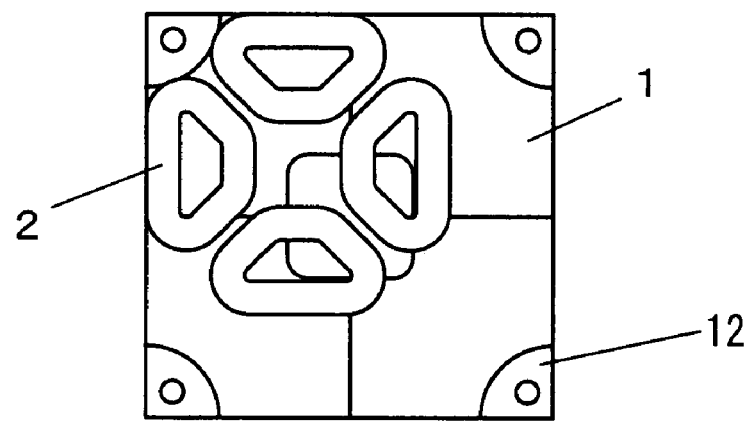
Figure 2C:
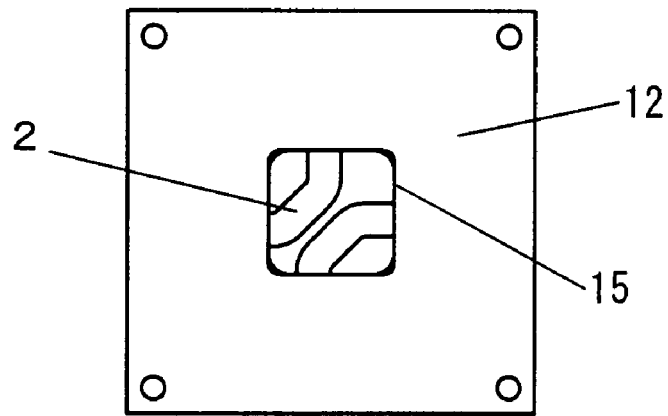

FIGS. 2A through 2C illustrate the structure of FIG. 1B in greater detail. FIG. 2A is a perspective view illustrating the relationship between the magnets 1 and the coils 2, FIG. 2B is a plan view of the same, and FIG. 2C is a bottom view of the same. In FIGS. 2A through 2C, the magnets 1 are secured onto a bottom plate 12. The coils 2 face the flat surfaces of the magnets 1 that are arranged in a flat form, and move two-dimensionally over the magnets 1 (in-plane movement). In this embodiment, the bottom plate 12 has an opening 15 to detect movements of the coils 2.

The magnets 1 shown in FIG. 1B and FIGS. 2A through 2C may be either permanent magnets or electromagnets. Also, the magnets 1 may be moved while the coils 2 are secured.

Figure 3:
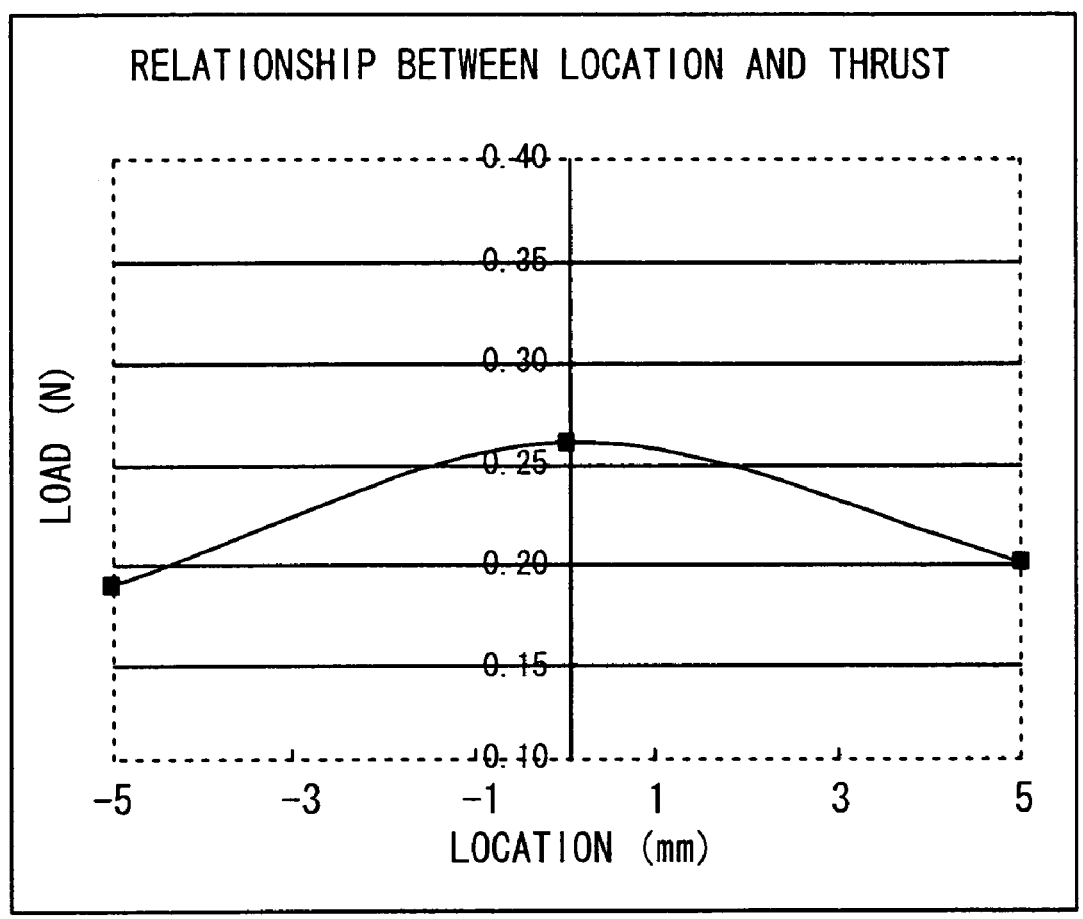
FIG. 3 illustrates the relationship between the location of the coils in the X-direction and the Y-direction of FIG. 1B and thrust force.

FIG. 3 illustrates the relationship between the location of the coils and the thrust force (load N) in the X-direction and the Y-direction in FIG. 1B. In FIG. 3, the location of the coils is represented by the abscissa axis, while the load N caused in the coils is represented by the ordinate axis. In this example, a current of 200 mA is applied to the coils, and magnets of 12000 Gauss are employed. In FIG. 1B, the position in which each of the coils 2 lies across an N-pole and an S-pole is the center position. The greatest load N is generated in this center position, and it has been found that sufficient load N can be generated in a position that is off the center position by ±5 millimeters. In the following, further embodiments of the present invention will be described.

Figure 4:
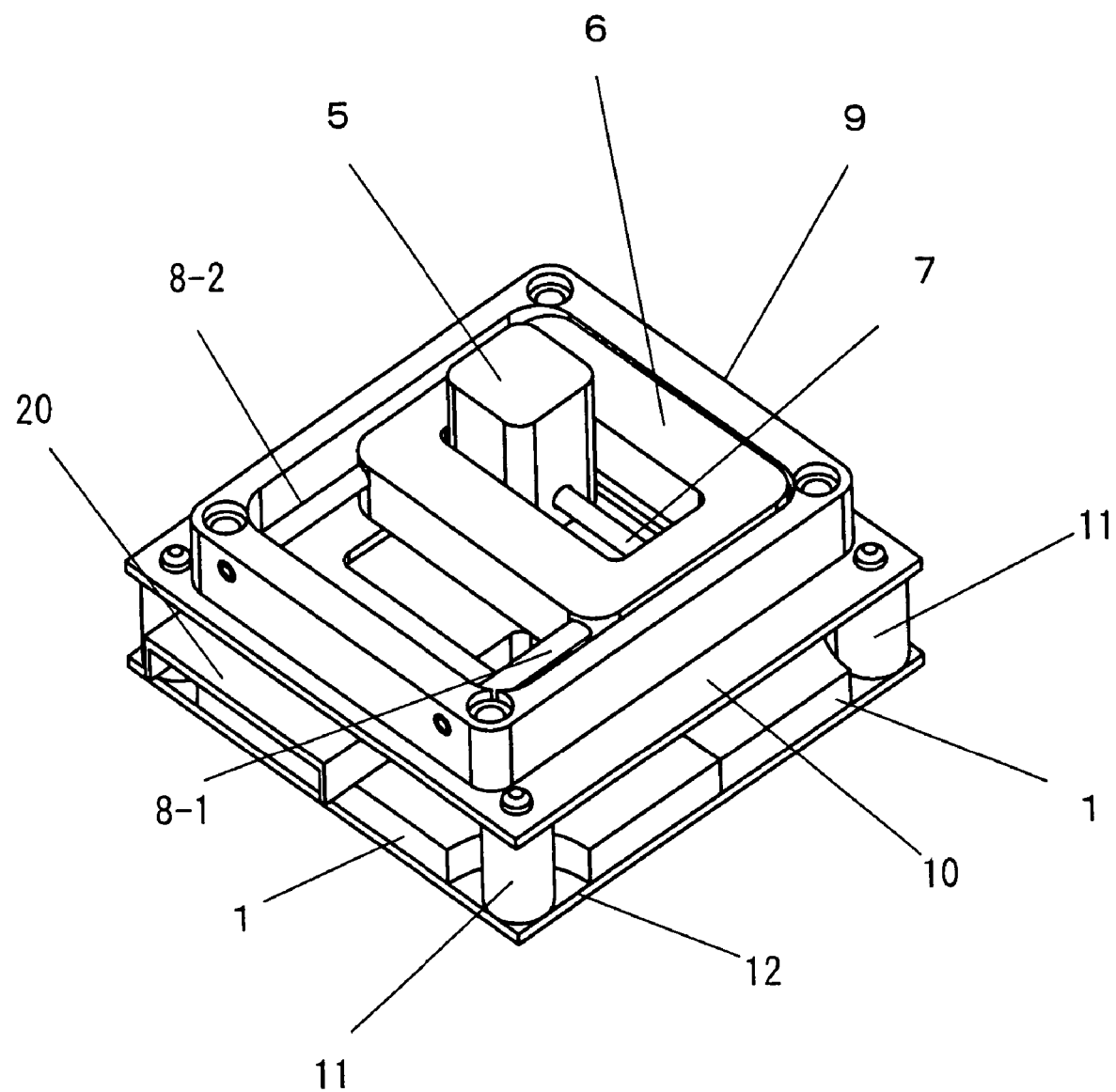
FIG. 4 is a perspective view of an actuator of a first embodiment of the present invention.
Figure 5A:
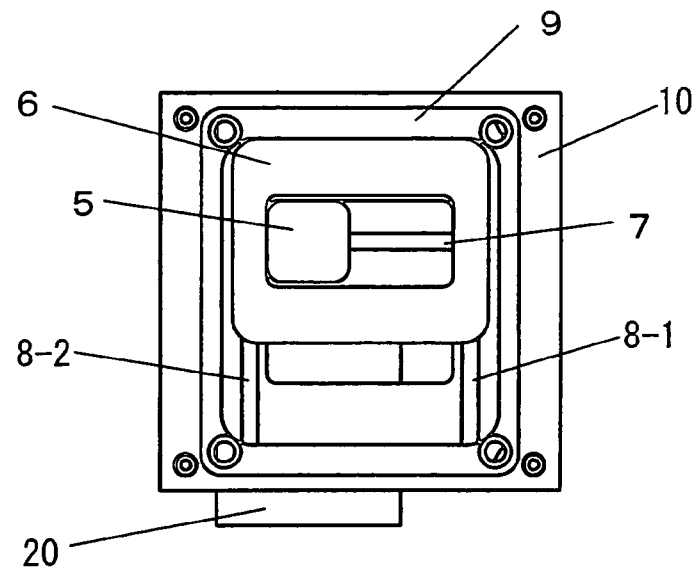
FIG. 5A is a plan view of the actuator of the first embodiment.
Figure 5B:
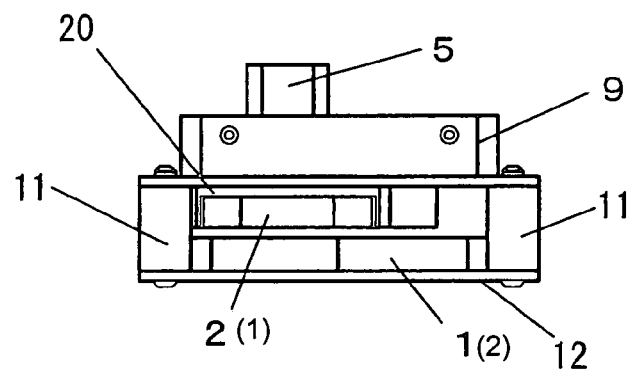
FIG. 5B is a front view of the actuator of the first embodiment.
Figure 5C:
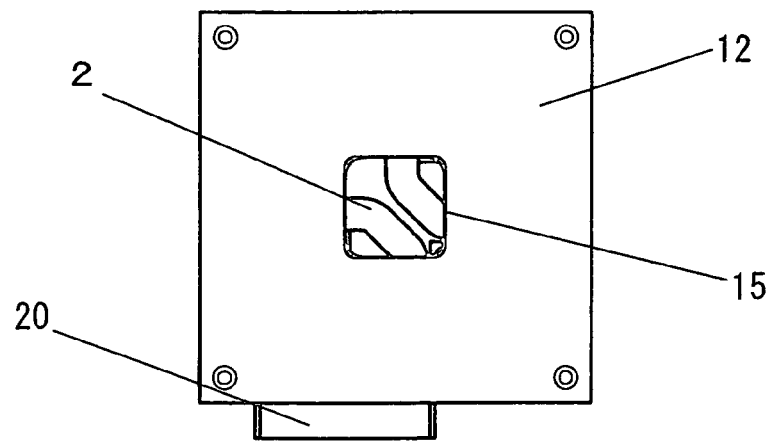
FIG. 5C is a bottom view of the actuator of the first embodiment.

FIG. 4 and FIGS. 5A through 5C illustrate an actuator that is a first embodiment of the present invention. FIG. 4 is a perspective view of this actuator, FIG. 5A is a plan view of the same, FIG. 5B is a front view of the same, and FIG. 5C is a bottom view of the same. This actuator is a component to be incorporated into a device such as a mouse.

In FIG. 4 and FIGS. 5A through 5C, this actuator is formed on the bottom plate 12. The magnets 1 arranged in flat form are placed onto the bottom surface 12, with the magnetic poles being located alternately (see FIGS. 2A through 2C). A supporting plate 10 is provided over the bottom plate 12 via spacers 11. A moving mechanism for moving the coils 2 two-dimensionally as described above is formed on the supporting plate 10. The parenthetical numbers (1) and (2) relate to an alternative embodiment in which the positions and shapes of the coils 2 and magnets 1 are reversed, or interchanged. Particularly, as explained in the description of FIG. 29. the coils (2) can be arranged in flat form and secured to the actuator, and the magnets (1) connected to the moving mechanism, for moving the magnets (1) two-dimensionally, reversing, or interchanging, the arrangement of coils 2 and magnets 1 of FIG. 5B.

Figure 6:
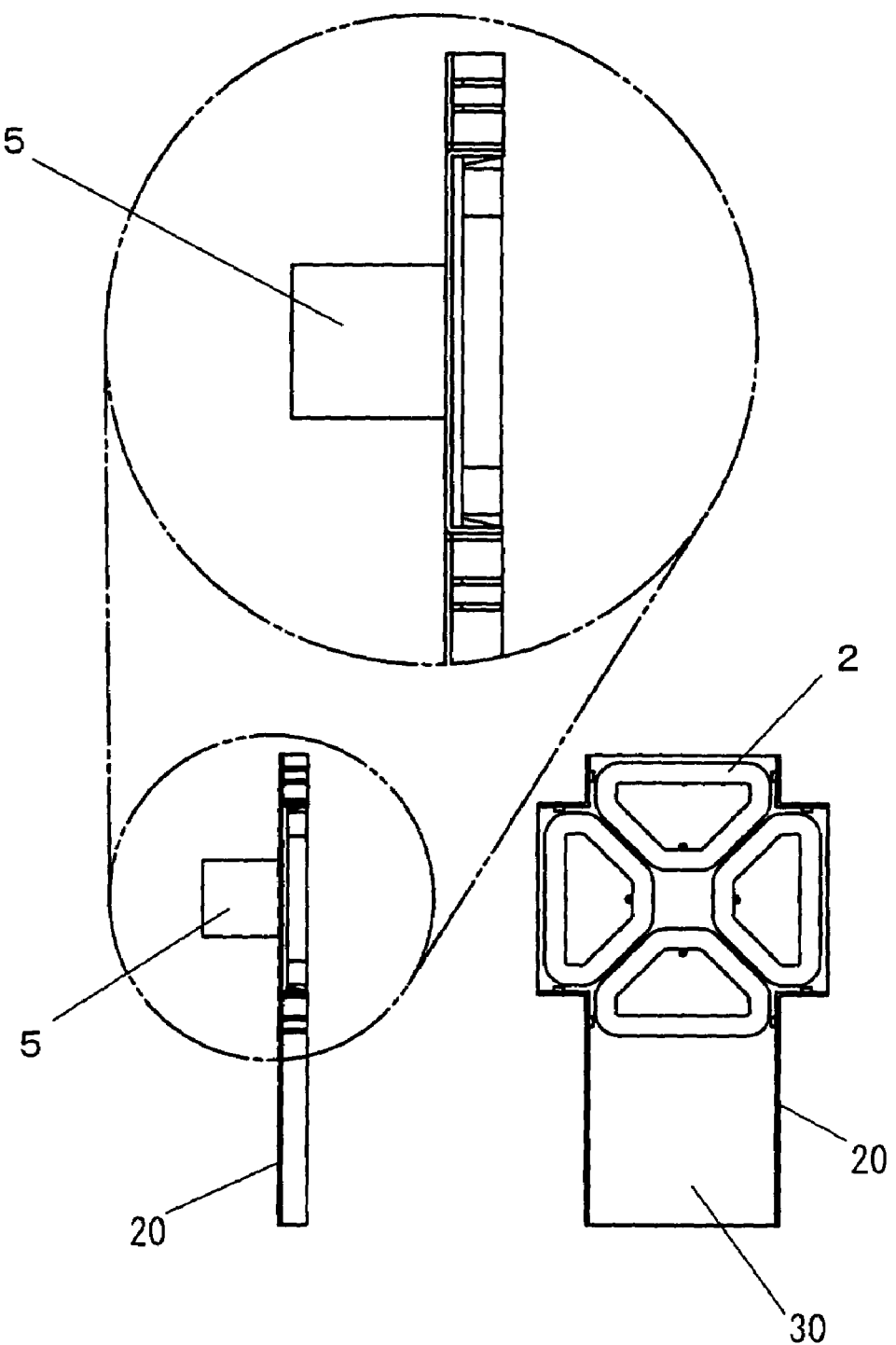
FIG. 6 illustrates the slider of the actuator of the first embodiment.

A slider 20 only partially shown as the moving mechanism in FIG. 4 faces the upper surfaces of the magnets 1, as shown in FIG. 5B. A moving piece 5 protrudes from the upper surface of the slider 20. A front view and a side view of the slider 20 are shown in FIG. 6. In the side view, an enlarged view of a part of the slider 20 is shown. A circuit board 30 is embedded in the slider 20, and the coils 2 are secured to the board 30. The moving piece 5 is formed on the back of the slider 20.

Referring back to FIG. 4, the moving piece 5 is slidably held by a first holding member 6. A through hole is formed in the lower part of the moving piece 5, so that the moving piece 5 is engaged with a shaft 7 provided to the first holding member 6. This shaft 7 is secured to the inner surface of the ring-like first holding member 6. Accordingly, the moving piece 5 can slide in one direction while being held by the shaft 7 inside the first holding member 6.

The first holding member 6 is also slidably held by a second holding member 9. The second holding member 9 has a pair of shafts 8-1 and 8-2 that are arranged at a distance from each other. The first holding member 6 is slidably engaged with the shafts 8-1 and 8-2. A through hole is formed at either side of the first holding member 6, so that the first holding member 6 can be engaged with the shafts 8-1 and 8-2. Accordingly, the first holding member 6 slidably moves while being held by the shafts 8-1 and 8-2 inside the second holding member 6.

In the above structure, the moving piece 5 slides in one direction inside the first holding member 6, and the first holding member 6 moves inside the second holding member 9 in a direction perpendicular to the moving direction of the moving piece 5. Accordingly, when a certain thrust force is applied to the slider 20 having the coils 2 connected thereto, the moving piece 5 can freely move in a two-dimensional plane. This actuator is incorporated into a device such as a mouse, so that an operator can touch the moving piece 5 with his/her finger and sense a thrust force generated in the actuator.

Figure 7A:
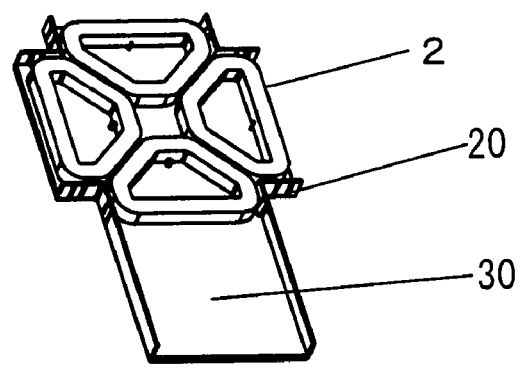
FIG. 7A is a perspective view of the slider of the actuator of the first embodiment.
Figure 7B:
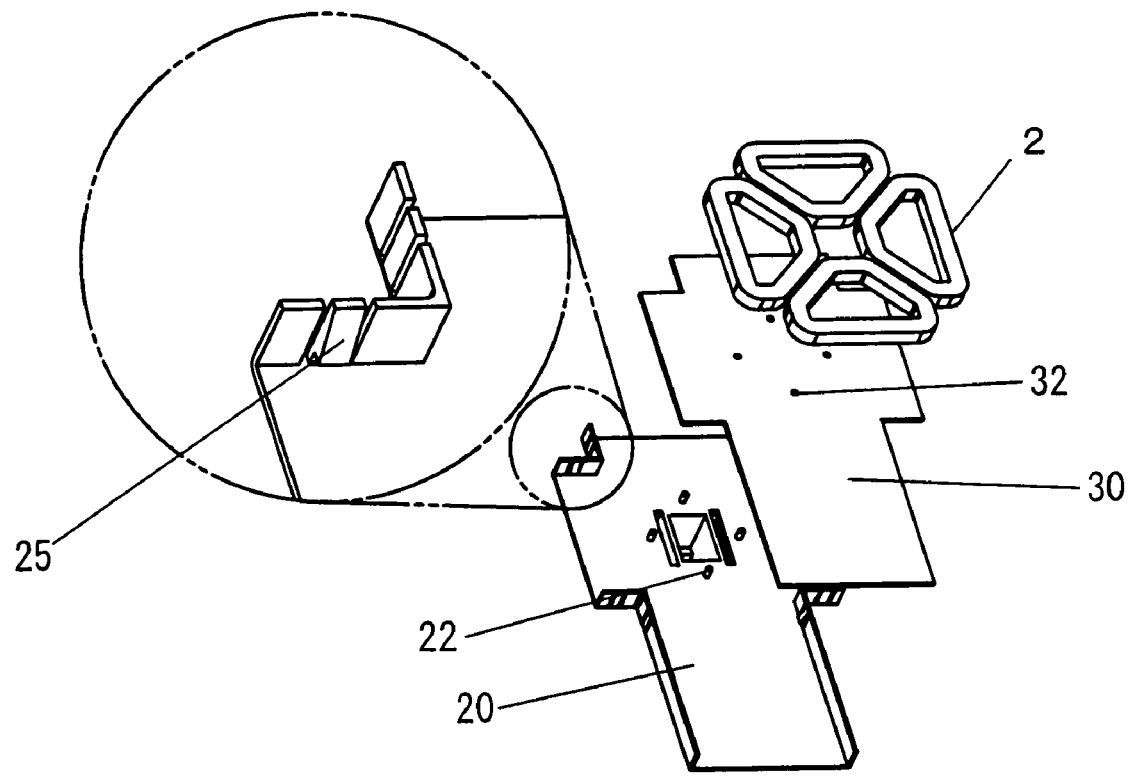
FIG. 7B is an exploded perspective view of the slider of the actuator of the first embodiment.

FIGS. 7A and 7B and FIGS. 8A and 8B illustrates example structures that can be employed as the slider 20. FIG. 7A is a perspective view of the slider 20, and FIG. 7B is an exploded view of the slider 20. The slider 20 has pins 22 for positioning the board 30. Openings 32 corresponding to the pins 22 are formed in the board 30. As can be seen from FIG. 7A, the pins 22 also define the location of the coils 22. With this structure, it is possible to position and secure the board 30 and the coils 2 to the slider 20 with high precision.

Further, positioning walls stand from the peripheral parts of the slider 20. Each of the walls has an engaging claw 25 that is tapered downward, as shown in the enlarged view indicated by a circle. Accordingly, when the board 30 is pressed downward, the engaging claw can surely catch the board 30.

Figure 8A:
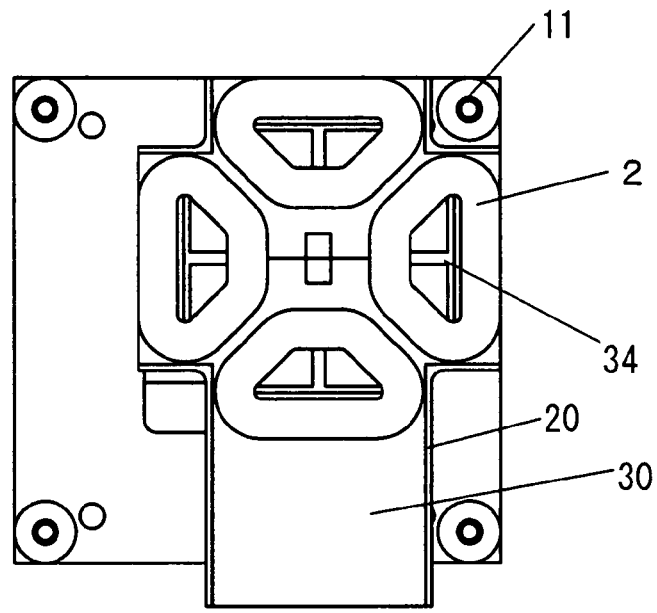
FIGS. 8A and 8B each illustrates an example structure that can be employed as the slider of the actuator of the first embodiment.
Figure 8B:
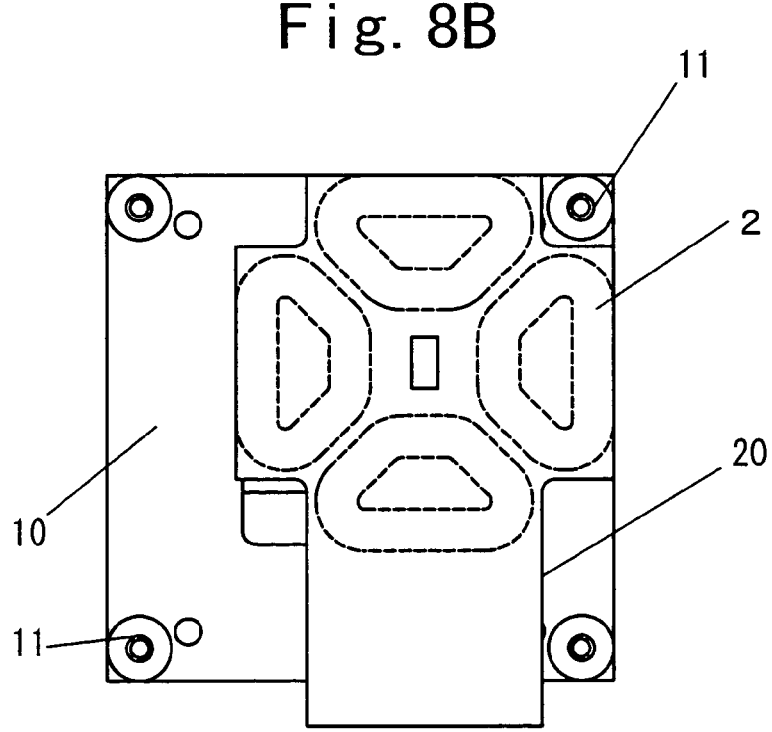

FIGS. 8A and 8B illustrate other example structures that can be employed as the slider 20 of the actuator. FIG. 8A shows a structure in which ribs 34 for positioning the coils 2 stand from the board 30. As can be seen from FIG. 8A, with the ribs 34, the coils 2 can be surely secured at the predetermined location on the board 30. FIG. 8B shows a structure in which the coils 2 are integrally molded with the board 30 that is made of a resin material. In this structure, the coils 2 are embedded in the board 30, and thus are surely held and secured. Furthermore, there is no need to employ parts for securing the coils 2.

Figure 9:
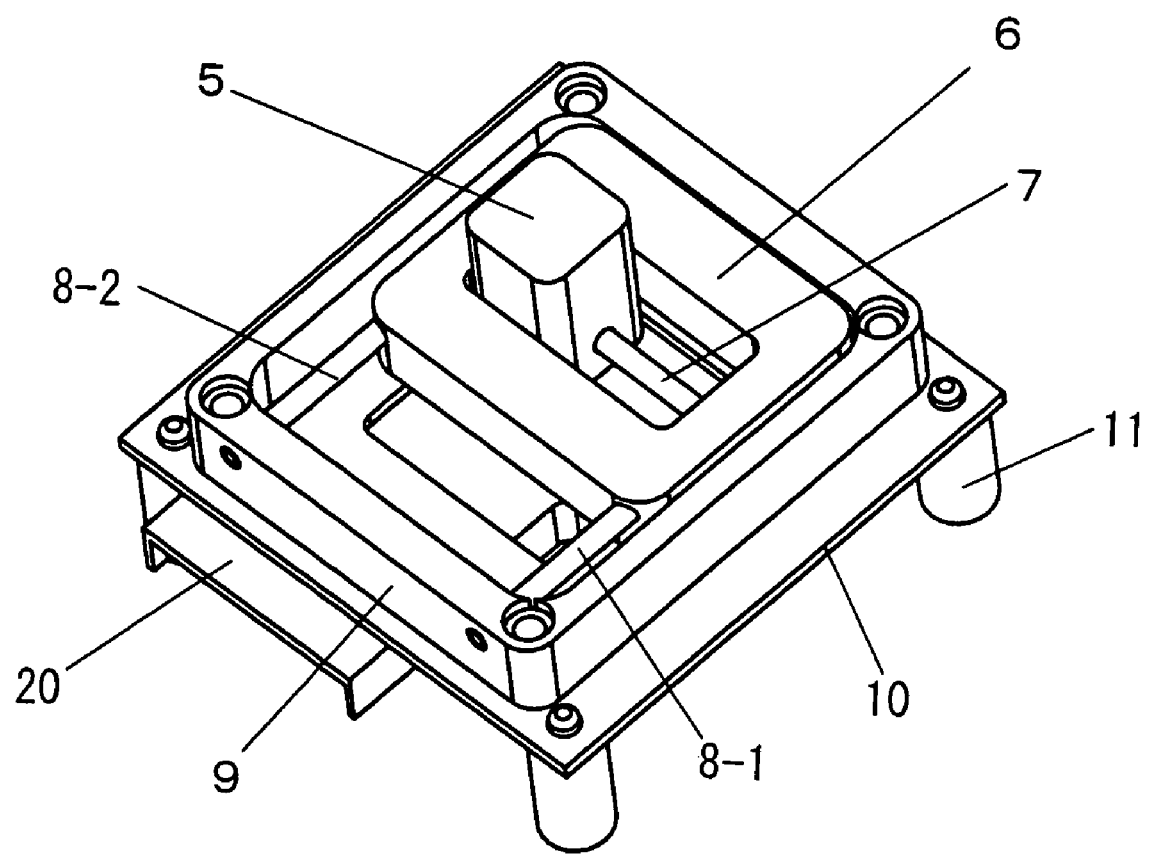
FIG. 9 illustrates a modification of the first embodiment.

FIG. 9 illustrates a modification of the first embodiment. The actuator shown in FIG. 4 is a self-contained structure, with the magnets 1 being secured onto the bottom plate 12. However, since this actuator is to serve as one component, the same structure can be obtained by arranging the magnets 1 on a board to which this actuator is to be secured. In such a case, an incomplete actuator without the bottom plate 12 and the magnets 1 arranged on the bottom plate 12, which are included in the structure shown in FIG. 4, should be prepared as shown in FIG. 9.

Figure 10:
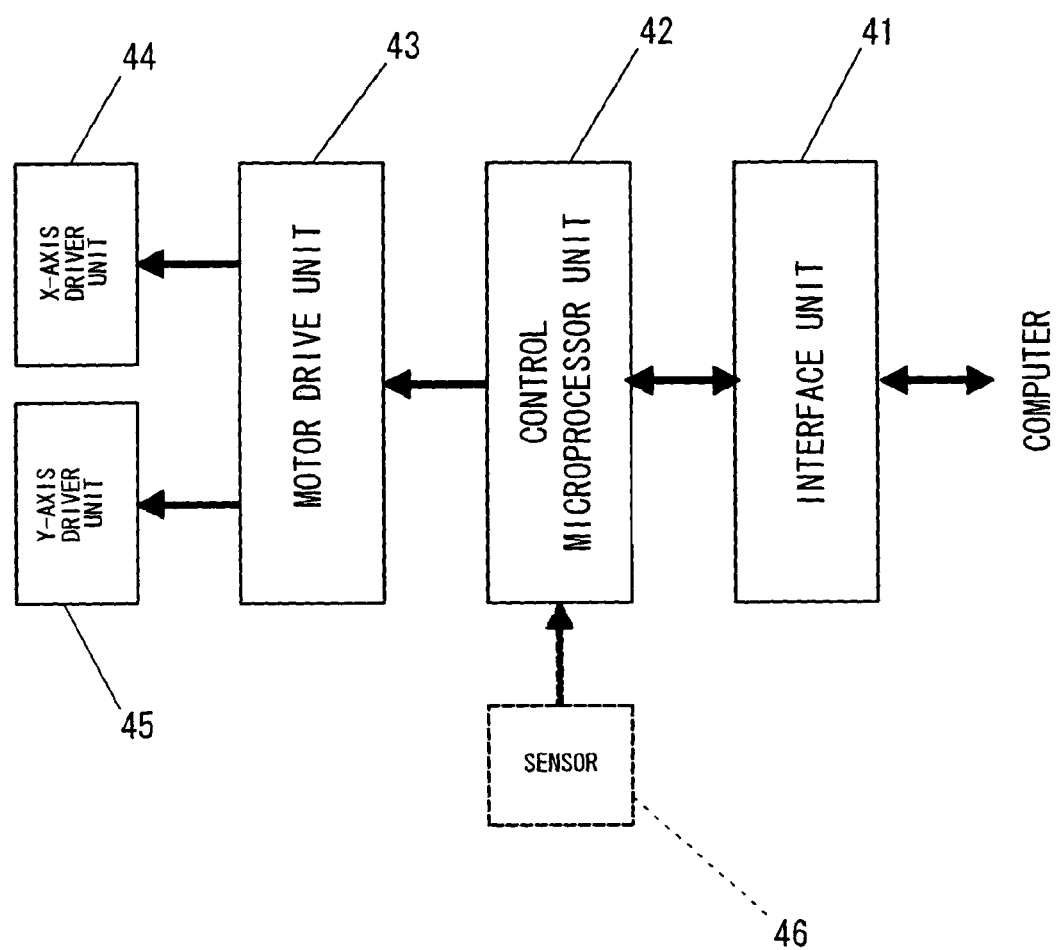
FIG. 10 is a block diagram illustrating an example structure of the actuator of the first embodiment.

FIG. 10 is a block diagram showing an example structure of this actuator. A unit such as a CPU provided to the board 30 serves as a control microcomputer unit 42 to control the current flowing into the coils of this actuator. The control microcomputer unit 42 is connected to an apparatus such as an external computer via an interface unit 41. Based on a signal supplied from the computer, the control microcomputer unit 42 supplies a drive signal to a motor driver unit 43. Upon receipt of the drive signal, the motor driver unit 43 adjusts the current to be supplied to an X-axis driver unit 44 and a Y-axis driver unit 45. Here, the X-axis driver unit 44 and the Y-axis driver unit 45 are equivalent to the coils 2 described above.

In a case where this actuator is incorporated into a mouse, it is necessary to detect the location of the coils 2. In such a case, a signal supplied from a sensor unit 46 such as a photodetector (PD) provided in the mouse is supplied to and utilized by the control microcomputer unit 42.

Figure 11A:
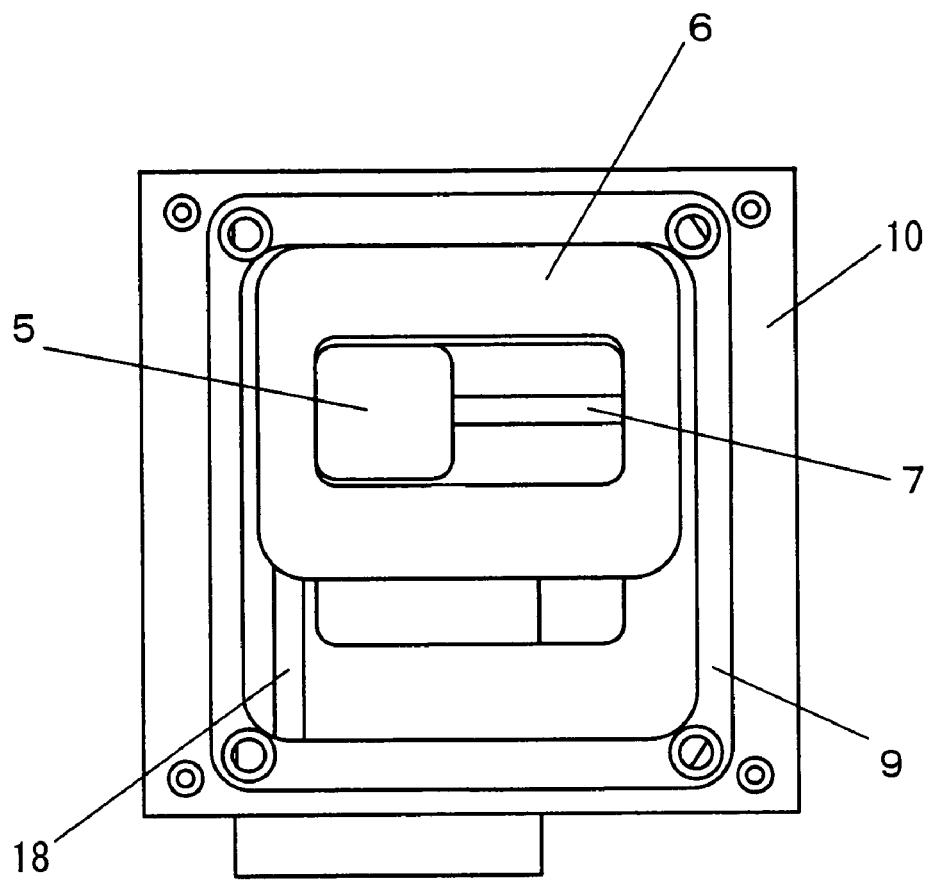
FIGS. 11A and 11B illustrate an actuator of a second embodiment of the present invention.
Figure 11B:
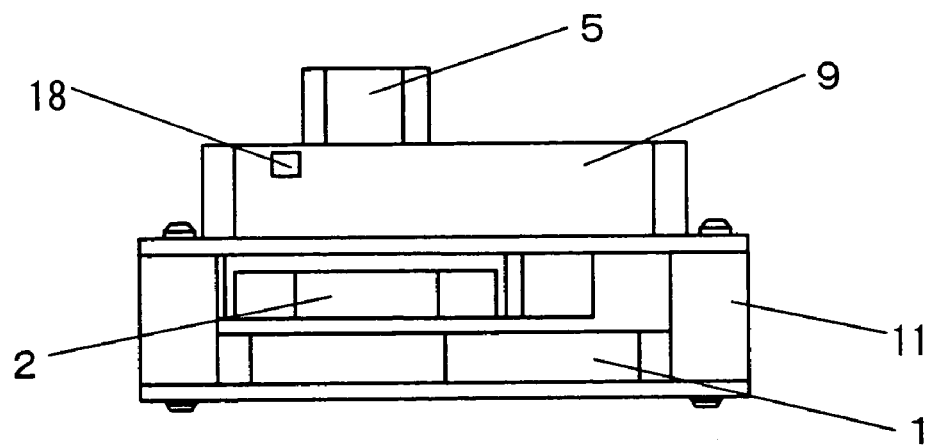

FIGS. 11A and 11B illustrate an actuator that is a second embodiment of the present invention. FIG. 11A is a plan view of the actuator, and FIG. 11B is a front view of the same. It should be noted that the same components as those in the first embodiment are denoted by the same reference numerals as the corresponding ones in the first embodiment, and explanation of those components will be omitted. This also applies to the descriptions of embodiments that will follow.

This embodiment is characterized in that the shafts 8-1 and 8-2 of the second holding member 9 holding the first holding member 6 are replaced with a single shaft 18 that has a quadrangular section. The shaft 18 is secured to one inner side of the second holding member 9. Since the section of the shaft 18 is quadrangular, the first holding member 6 does not rotate on the shaft 18 even if the first holding member 6 is held only at an end. With the shaft 18, the first holding member 6 can be slidably cantilevered. As the number of shafts used in the second holding member 9 is reduced in this embodiment, the entire structure can be simplified, and the production costs can be reduced accordingly. Although being quadrangular in the example shown in FIGS. 11A and 11B, the section of the shaft 18 may be triangular, pentagonal, or in any other suitable angular form.

Figure 12A:
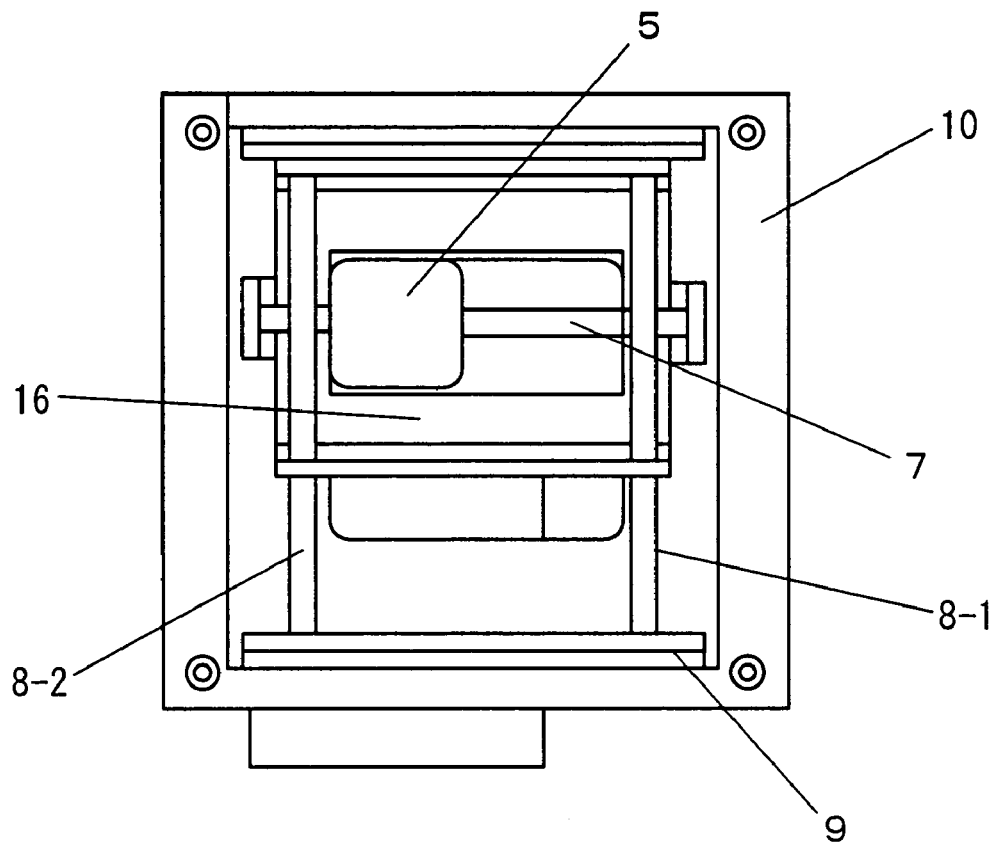
FIGS. 12A and 12B illustrate an actuator of a third embodiment of the present invention.
Figure 12B:
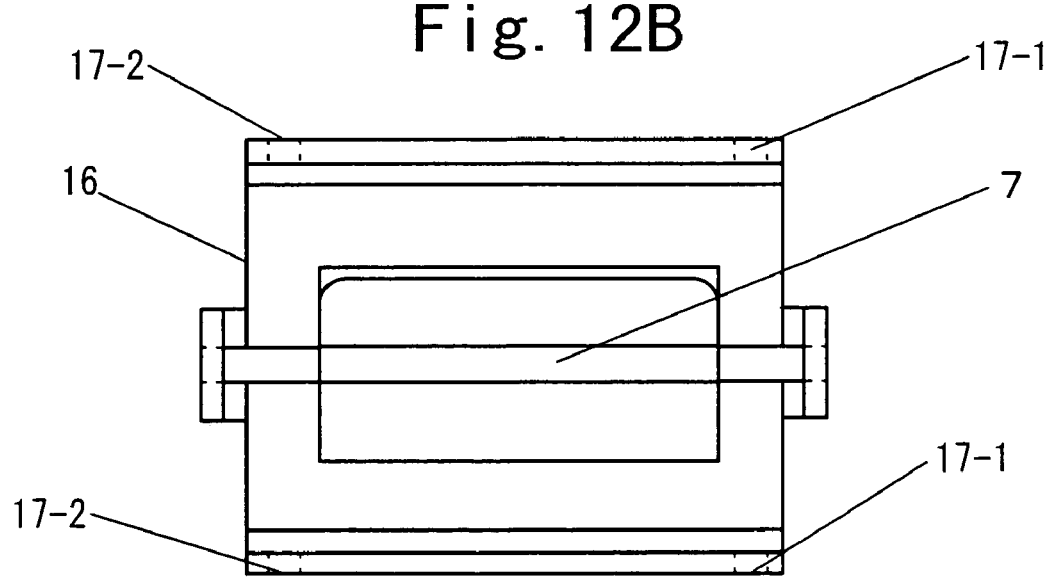

FIGS. 12A and 12B illustrate an actuator that is a third embodiment of the present invention. FIG. 12A is a plan view of the actuator, and FIG. 12B is an enlarged view of a first holding member 16 of the actuator. This embodiment is characterized in that the first holding member 16 is formed by performing bending or pressing on a sheet metal material. To form the first holding member 16 of this embodiment, the sheet metal material is bent and molded, and the shaft 7 is secured therein. Each of the standing parts that are to serve as side walls has a pair of openings 17-1 and 17-2 to be engaged with the shafts 8-1 and 8-2. As the first holding member 16 can be easily formed through metal plate processing, the production costs can be reduced.

Figure 13A:
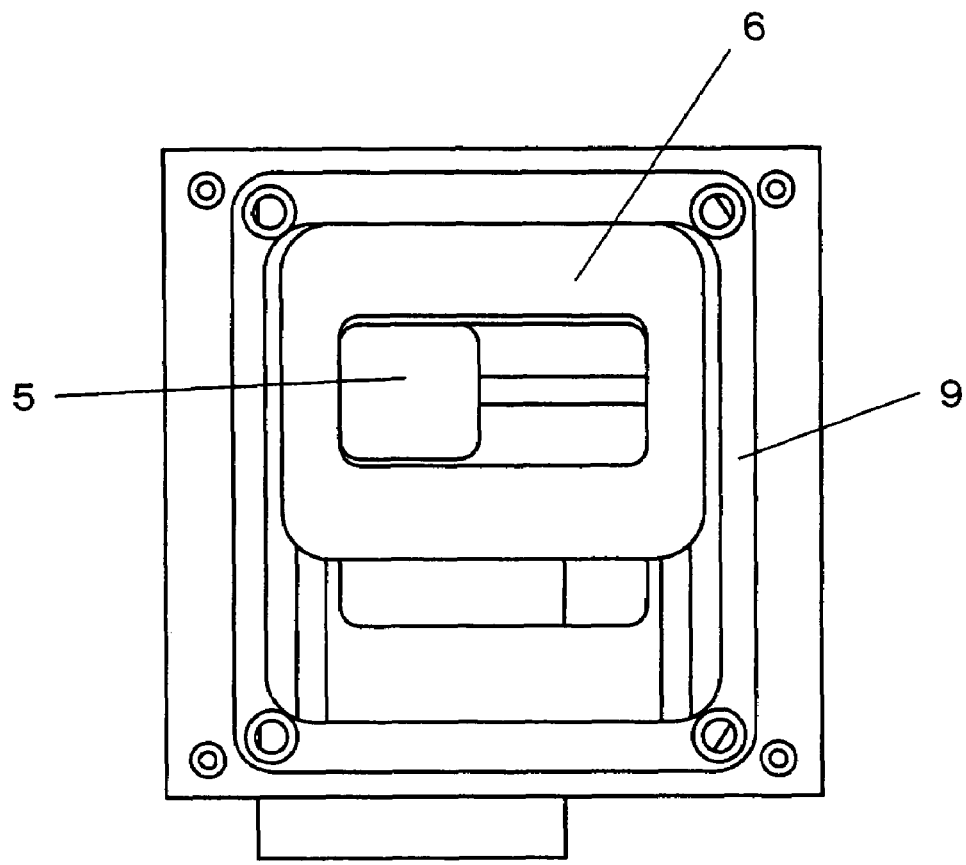
FIGS. 13A and 13B illustrate an actuator of a fourth embodiment of the present invention.
Figure 13B:
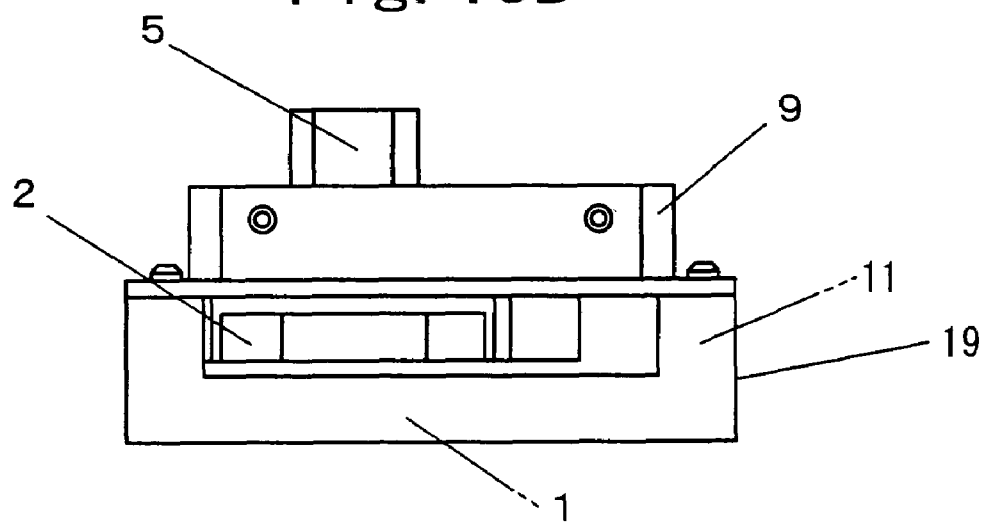

FIGS. 13A and 13B illustrate an actuator that is a fourth embodiment of the present invention. FIG. 13A is a plan view of the actuator, and FIG. 13B is a front view of the same. In this embodiment, the magnets 1 and the spacers 11 of the first embodiment are integrally molded using a magnetic material to form a base 19. As the magnets and the spacers are integrally formed in this embodiment, the number of components is reduced, and the production procedures can be simplified.

Figure 14A:
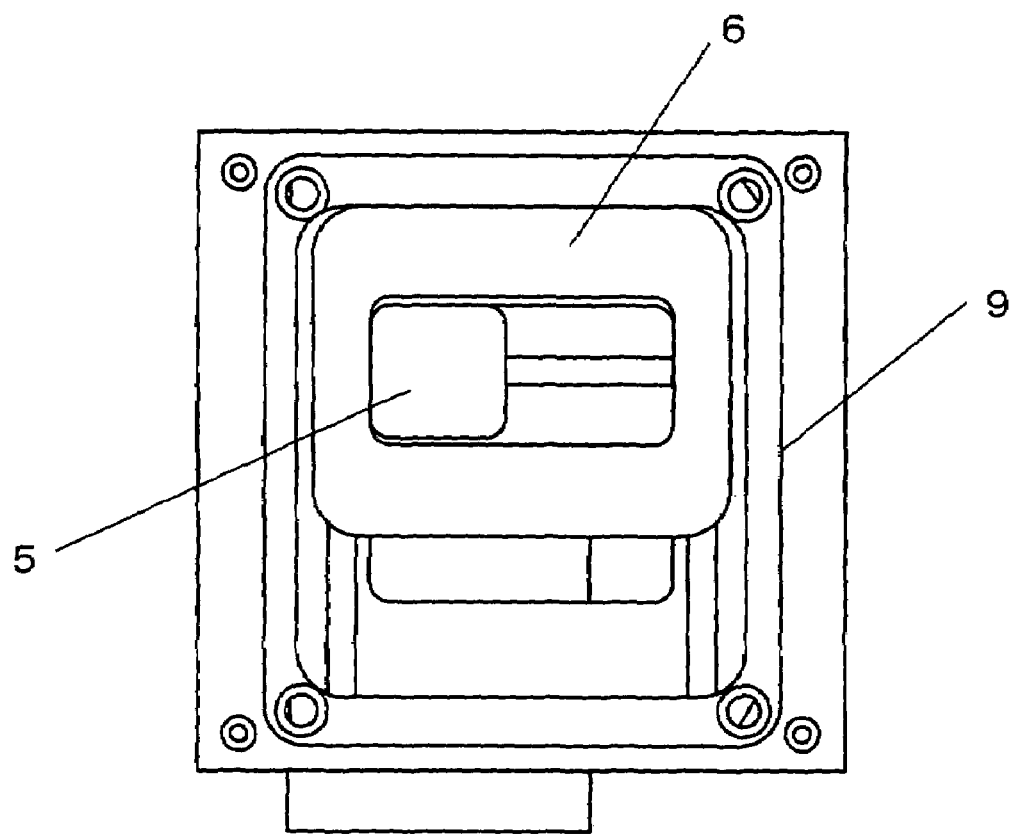
FIGS. 14A and 14B illustrate an actuator of a fifth embodiment of the present invention.
Figure 14B:
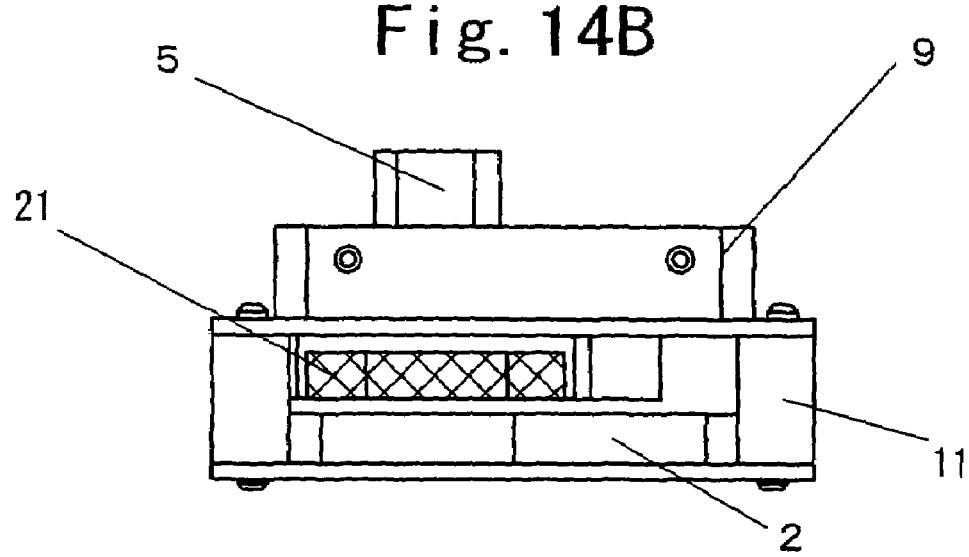

FIGS. 14A and 14B illustrate an actuator that is a fifth embodiment of the present invention. FIG. 14A is a plan view of the actuator, and FIG. 14B is a front view of the same. This embodiment is characterized by coils 21 that are coated with a black coating. As the exterior of the coils 21 is black, it is possible to prevent diffused reflection. If this actuator is incorporated into a device such as a mouse, and is placed near a light-emitting device such as a LED, a decrease in detection sensitivity due to diffused reflection of the coils can be avoided.

Figure 15A:
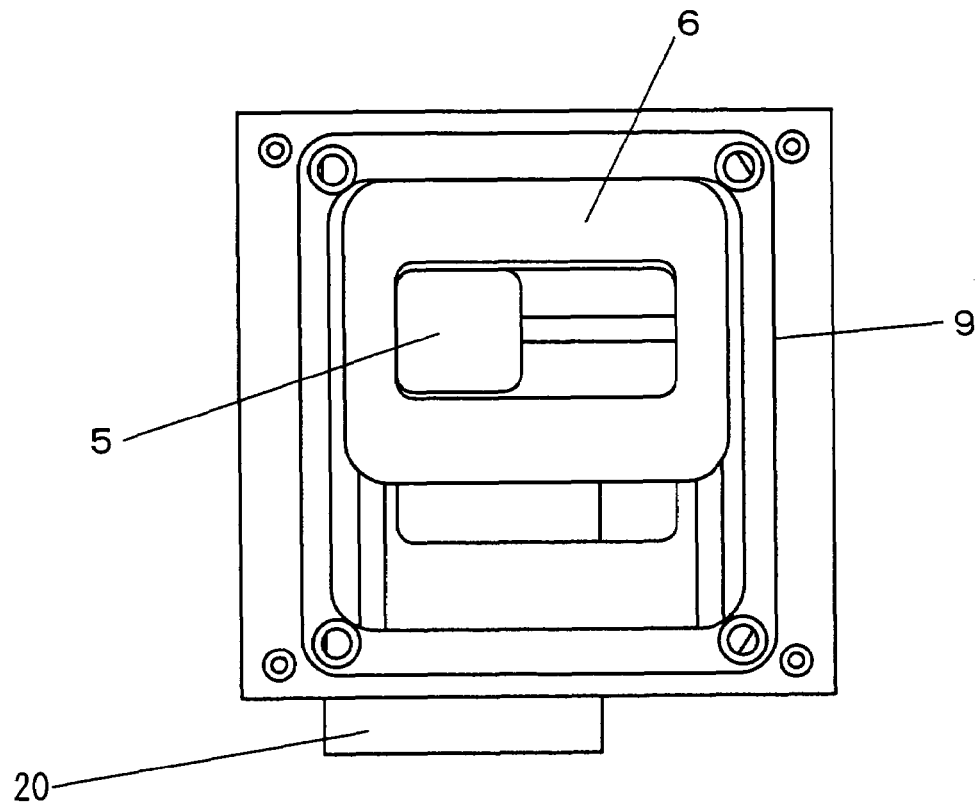
FIGS. 15A and 15B illustrate an actuator of a sixth embodiment of the present invention.
Figure 15B:
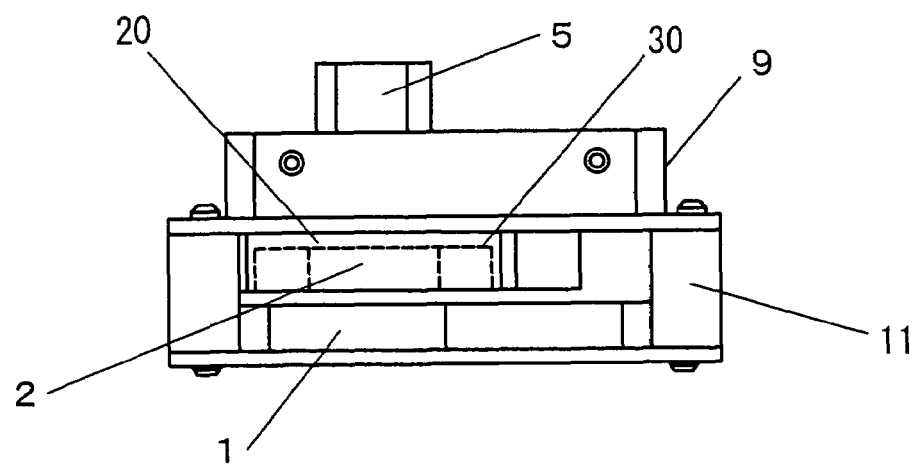

FIGS. 15A and 15B illustrate an actuator that is a sixth embodiment of the present invention. FIG. 15A is a plan view of the actuator, and FIG. 15B is a front view of the same. This embodiment is characterized in that the coils 2 are insert-molded with and secured to the resin board 30 to be secured to the slider 20. Through the insert-molding, the step of incorporating the coils 2 into the board 30 can be omitted, and the coils 2 can be surely secured to the board 30.

Figure 16:
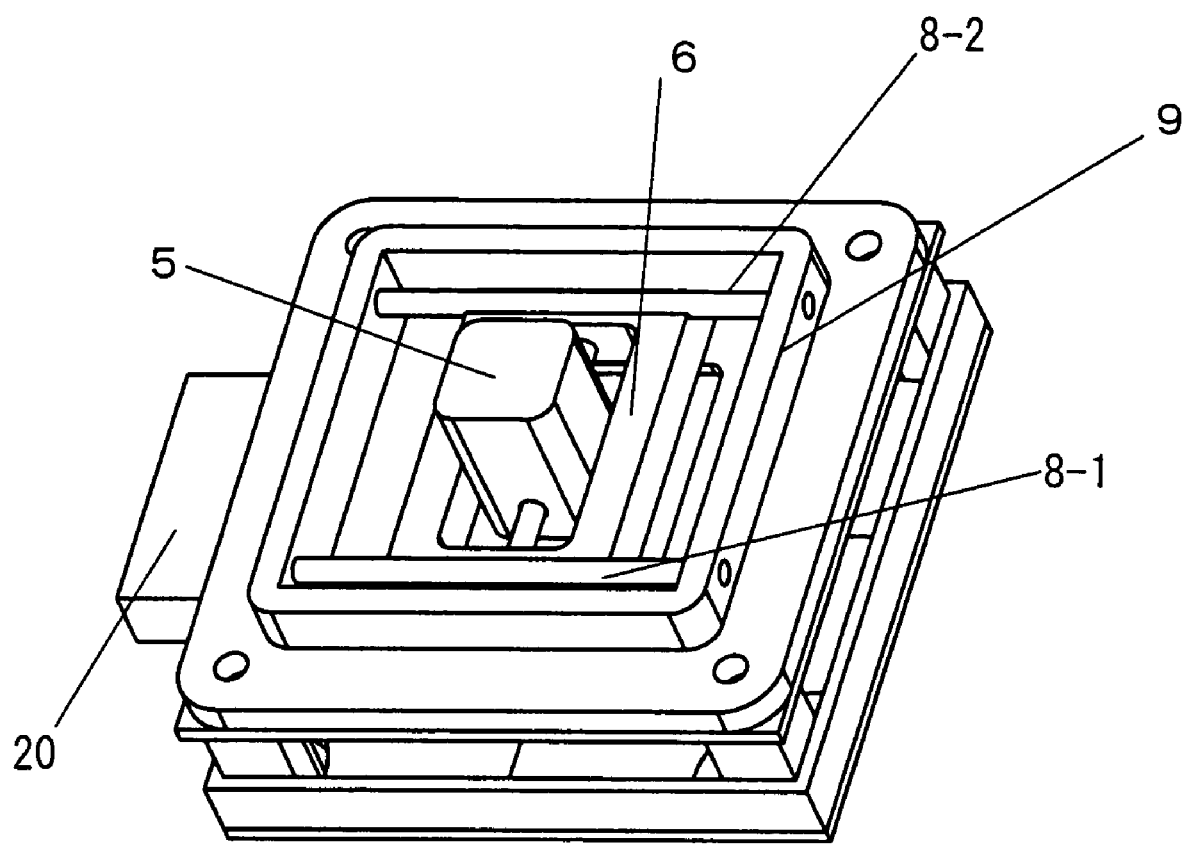
FIG. 16 is a perspective view of an actuator of a seventh embodiment of the present invention.
Figure 17A:
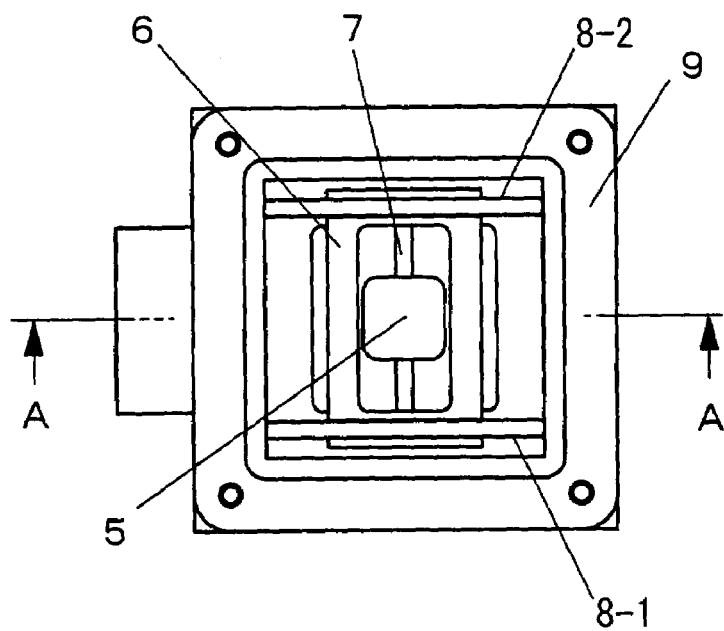
FIG. 17A is a plan view of the actuator of the seventh embodiment.
Figure 17B:
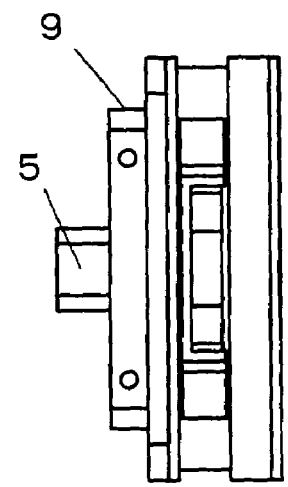
FIG. 17B is a side view of the actuator of the seventh embodiment.
Figure 17C:
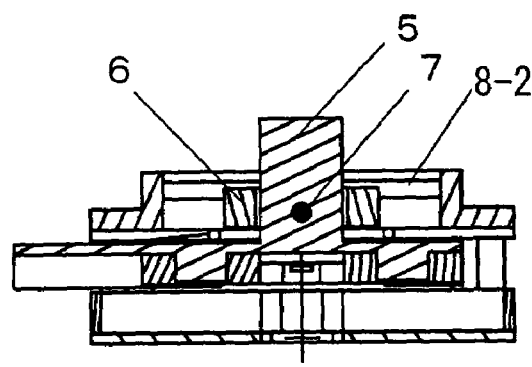
FIG. 17C is a section view of the actuator of the seventh embodiment.

FIG. 16 and FIGS. 17A through 17C illustrate an actuator that is a seventh embodiment of the present invention. FIG. 16 is a perspective view of the actuator. FIG. 17A is a plan view of the actuator, FIG. 17B is a side view of the same, and FIG. 17C is a section view of the same, taken along the line A—A of FIG. 17A. This embodiment is characterized in that the first holding member 6 is molded in such a manner as to be in contact only with the lower sides of the pair of shafts 8-1 and 8-2 of the second holding member 9. This feature of the first holding member 6 is more clearly shown in FIGS. 7A and 7C.

As the first holding member 6 does not need to have holes to be engaged with the shafts 8-1 and 8-2 in this embodiment, the entire structure can be simplified. Also, as the second holding member 9 can be simply placed onto the first holding member 6, the production procedures can be simplified.

Figure 18A:
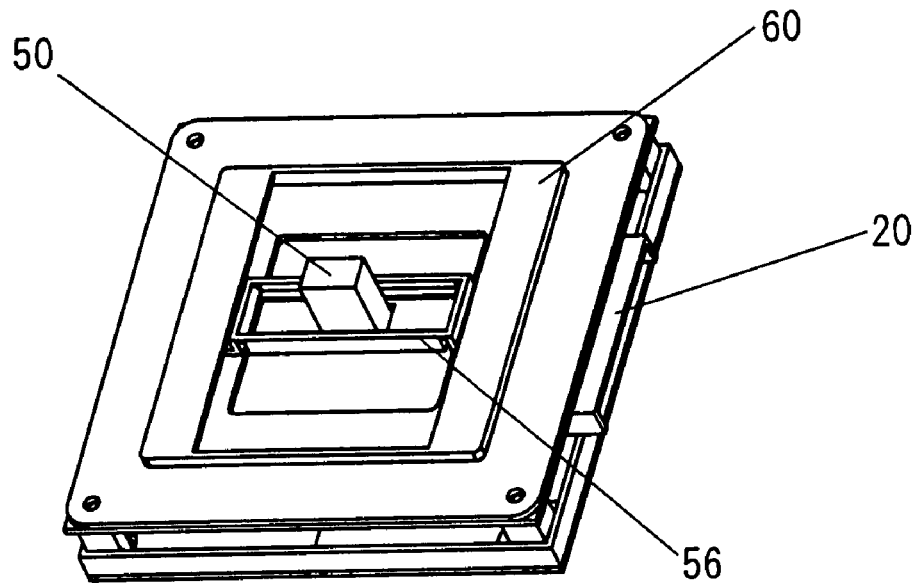
FIG. 18A is a perspective view of an actuator of an eighth embodiment of the present invention.
Figure 18B:
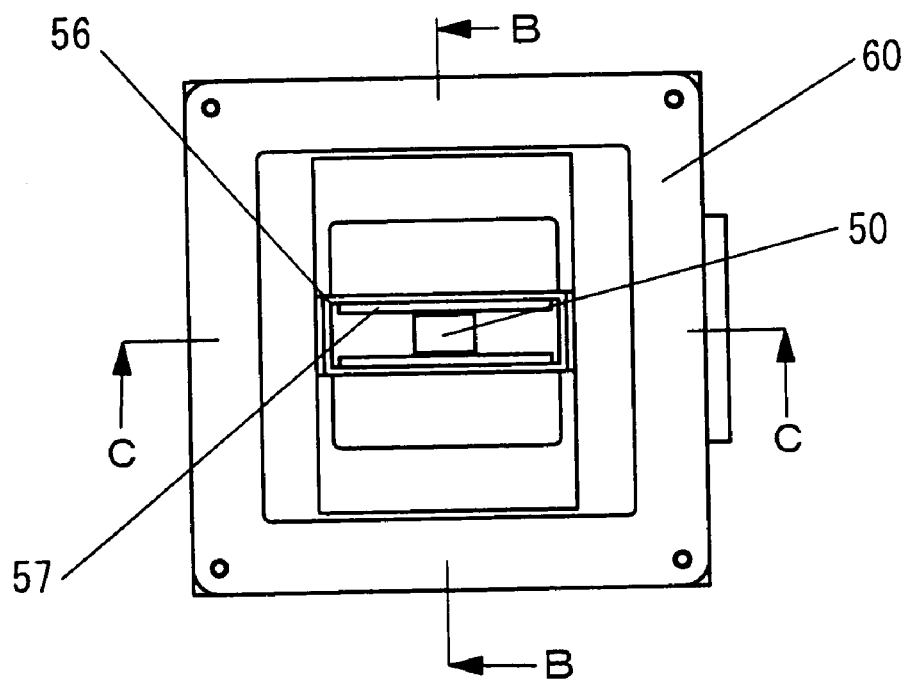
FIG. 18B is a plan view of the actuator of the eighth embodiment.
Figure 19A:
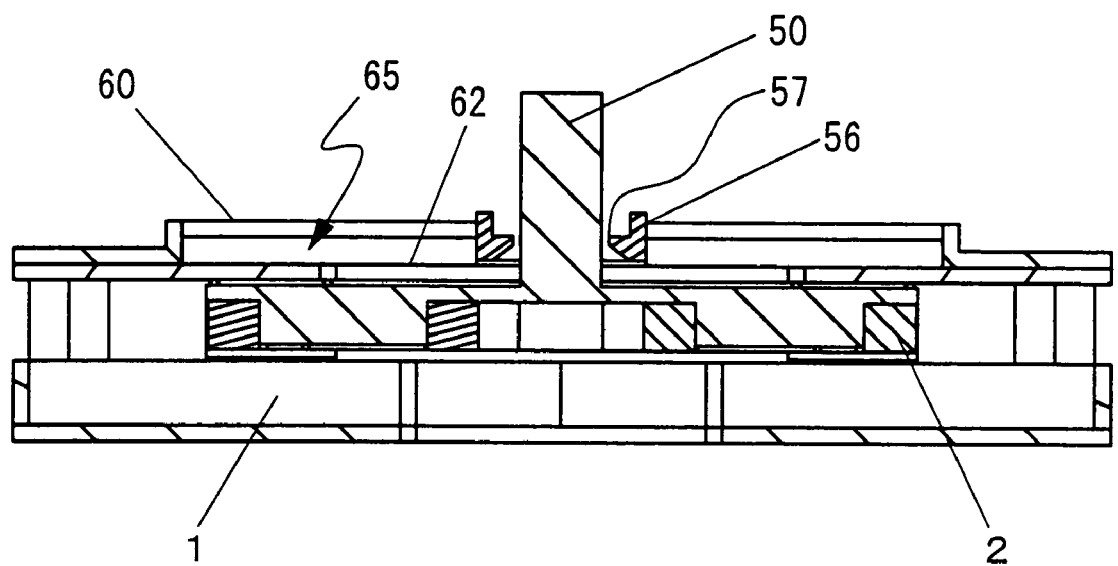
FIG. 19A is a section view of the actuator of the eighth embodiment, taken along the line B—B of FIG. 18B.
Figure 19B:
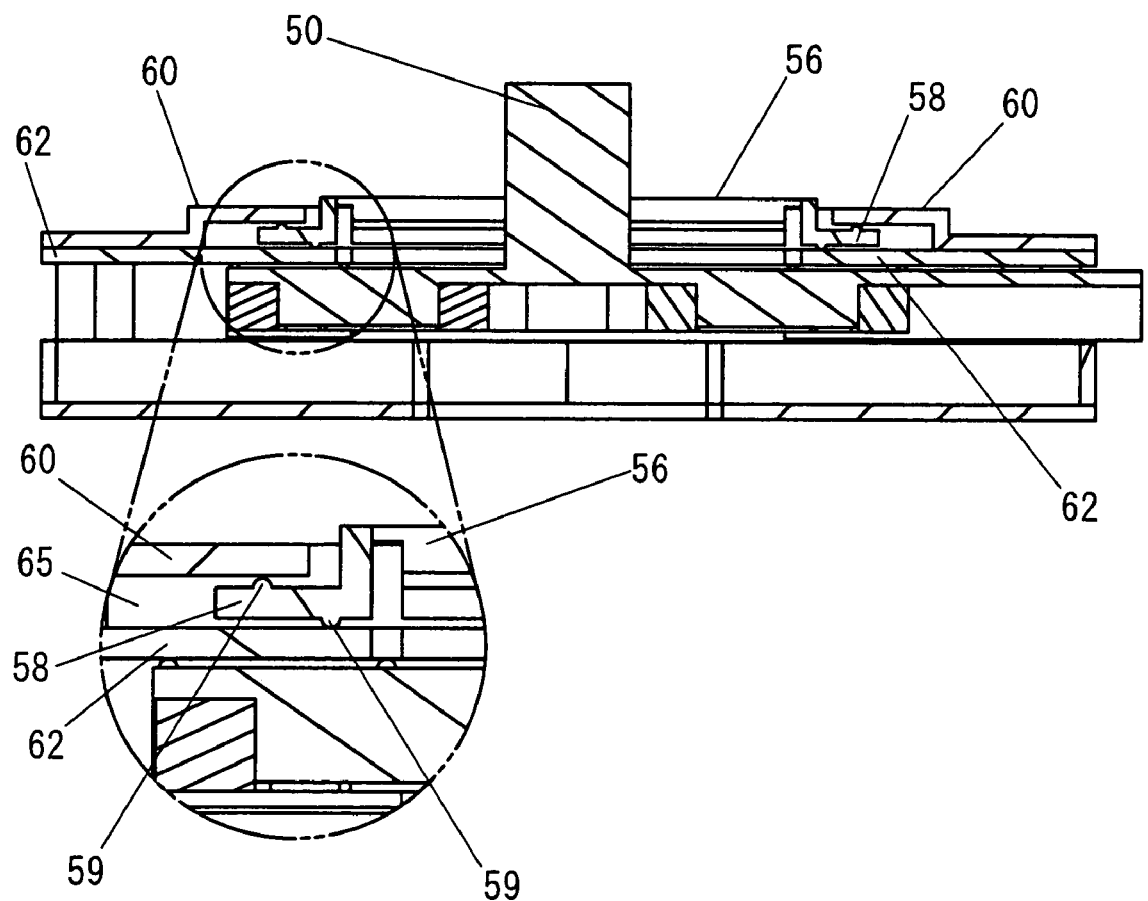
FIG. 19B is a section view of the actuator of the eighth embodiment, taken along the line C—C of FIG. 18B.

FIGS. 18A through 19B illustrate an actuator that is a ninth embodiment of the present invention. FIG. 18A is a perspective view of the actuator, and FIG. 18B is a plan view of the same. FIG. 19A is a section view of the actuator, taken along the line B—B of FIG. 18B. FIG. 19B is a section view of the actuator, taken along the line C—C of FIG. 18B.

In the foregoing embodiments, the first holding member 6 includes the shaft 7, and the second holding member 9 includes the shafts 8-1 and 8-2 or the shaft 18. However, this embodiment is a structure that does not require any shaft. As can be seen from FIGS. 18A and 18B, a moving piece 50 is guided by a guide member 56 that is equivalent to the first holding member 6. This guide member 56 is guided along guide paths 65 formed by an upper guide plate 60 and a lower guide plate 62. Accordingly, the guide member 56 is equivalent to the first guide member in claims, and the upper guide plate 60 and the lower guide plate 62 are equivalent to the second guide member in claims.

The moving piece 50 of this embodiment is guided along the inner wall of the guide member 56 that is formed in a rectangular shape. The slider 20 to which the coils 2 are secured is connected to the lower end of the moving piece 50. The coils 2 face the magnets 1 below. When a predetermined current is not supplied to the coils 2, the coils 2 are placed directly onto the magnets 1. When the current is supplied to the coils 2, the coils 2 are lifted off the magnets 1 by virtue of magnetic repulsion caused between the coils 2 and the magnets 1. Thus, the coils 2 can be moved against the magnets 1.

As can be seen from FIG. 19A, the guide member 56 has inner walls 57 that have very small areas so as to reduce friction with the moving piece 50. As shown in FIG. 19B, both end parts 58 of the guide member 56 each has a step-like shape. Each of the end parts 58 is inserted into each corresponding guide path 65 formed by the upper guide plate 60 and the lower guide plate 62. As shown in the enlarged view indicated by a circle, the upper and lower surfaces of each end part 58, i.e., the surfaces to face the upper guide plate 60 and the lower guide plate, each has a protrusion 59. Accordingly, the friction is minimized when the guide member 56 moves along the guide paths 65. Each protrusion 59 extends in the longitudinal direction and thus serves as a rail. Although the protrusions 59 are formed on the end parts 58 in this embodiment, it is also possible to provide the protrusions 59 on the upper guide plate 60 and the lower guide plate 62, instead of on the end parts 58. Also, each protrusion 59 is not limited to the rail type, but the same effects can be achieved with a structure having hemispheric protrusions that are scatteringly formed thereon. As the actuator of this embodiment does not employ a shaft, the entire structure can be simplified, and the work efficiency in assembling the actuator can be increased.

Figure 20A:
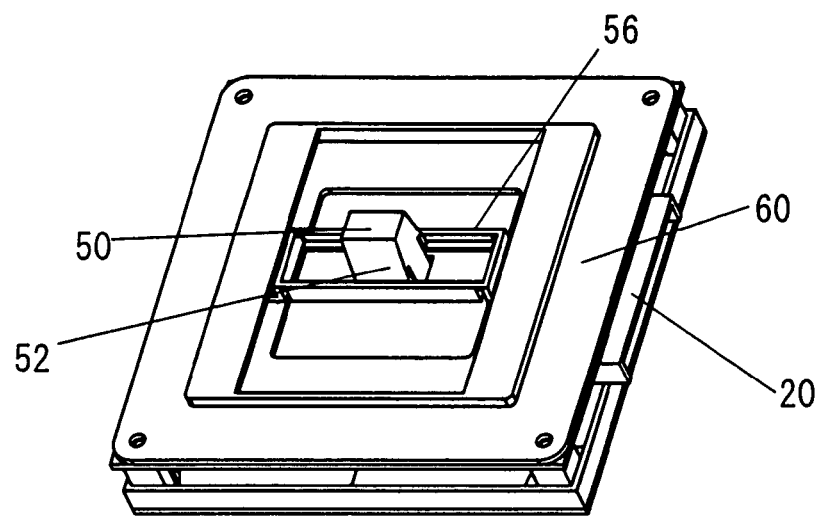
FIG. 20A is a perspective view of an actuator of a ninth embodiment of the present invention.
Figure 20B:
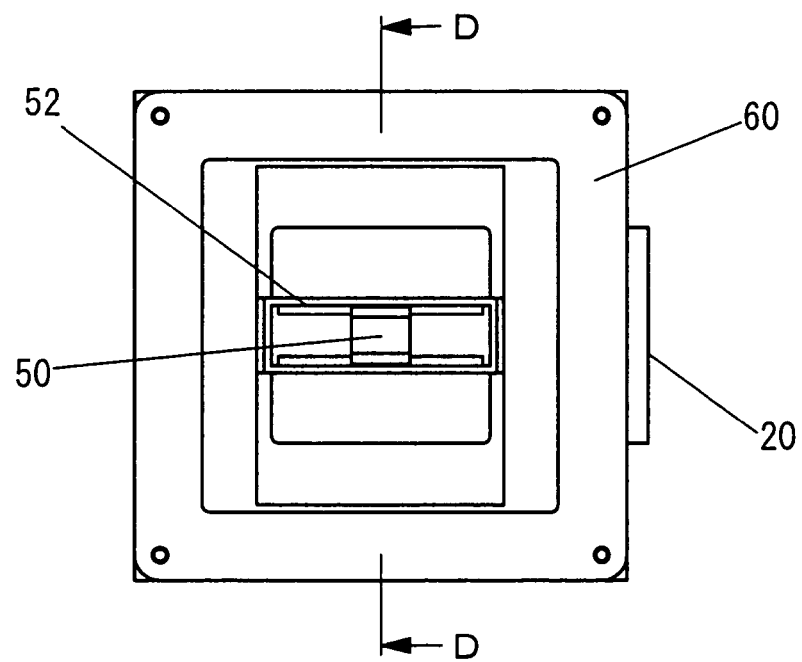
FIG. 20B is a plan view of the actuator of the ninth embodiment.
Figure 21:
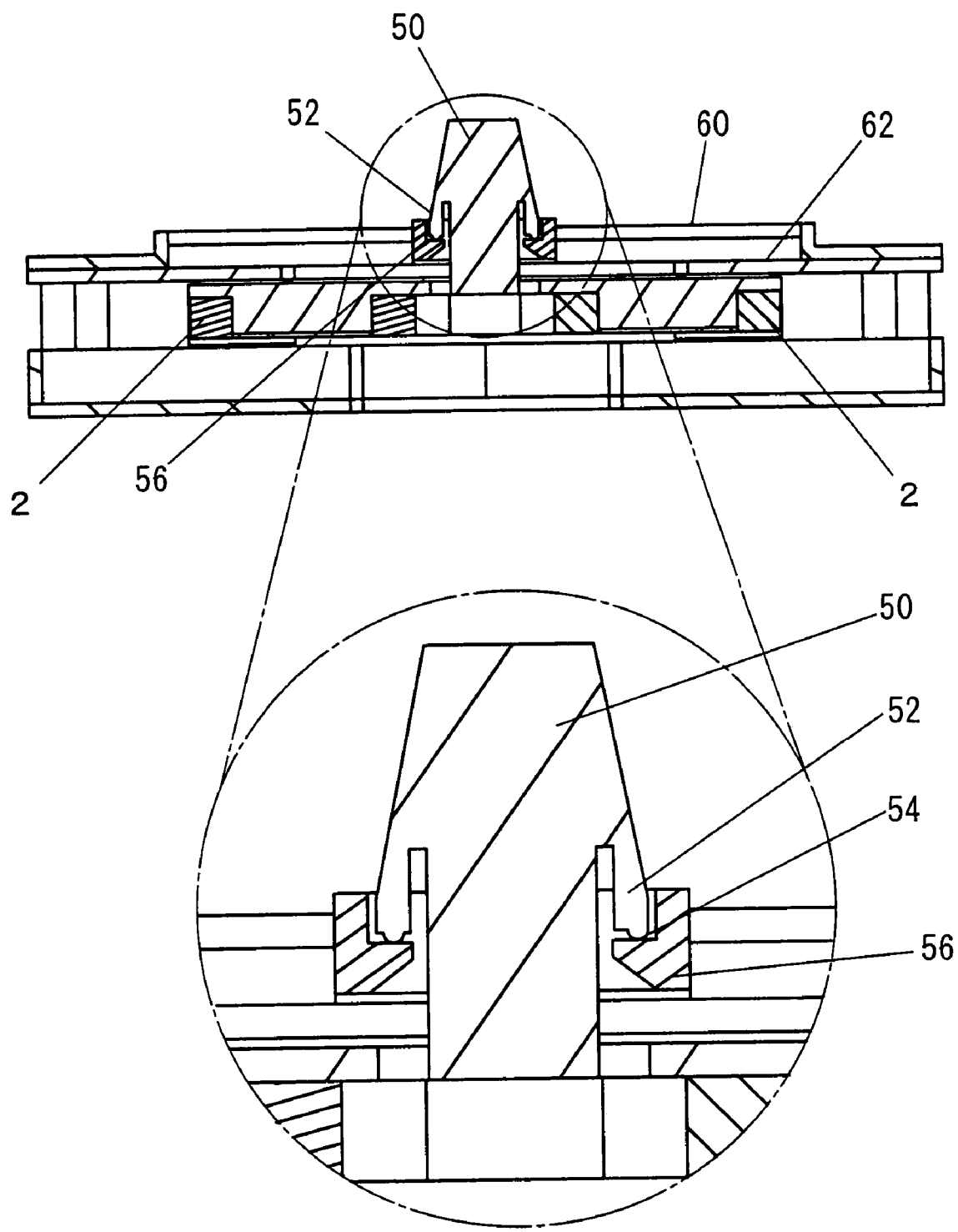
FIG. 21 is a section view of the actuator of the ninth embodiment, taken along the line D—D of FIG. 20B.

FIGS. 20A and 20B and FIG. 21 illustrate an actuator that is a ninth embodiment of the present invention. FIG. 20A is a perspective view of the actuator, and FIG. 20B is a plan view of the same. FIG. 21 is a section view of the actuator, taken along the line D—D of FIG. 20B. This embodiment is an improved modification of the eighth embodiment. The moving piece 50 has an engaging tongue 52 at either side. Each engaging tongue 52 is engaged with the guide member 56 so as to prevent the moving piece 50 from coming off the guide member 56.

Each of the engaging tongues 52 is a tongue-like part that protrudes from each corresponding side wall of the moving piece 50 and is tapered outward, as can be seen from FIG. 21. The engaging tongues 52 can be elastically deformed. At the time of assembling the actuator, the guide member 56 is positioned to the moving piece 50 and is pushed toward the guide member 56. By doing so, the engaging tongues 52 are elastically deformed. After sliding through the guide member 56, the engaging tongues 52 are restored to the original state, and are engaged with the guide member 56, as shown in FIG. 21. As the engaging tongues are located on the step-like parts of the guide member 56 and serve to prevent the guide member 56 from coming off, assembling the actuator can be efficiently conducted.

As the engaging tongues 52 are engaged with the guide member 56, the moving piece 50 as well as the slider 20 and the coils 2 located below the moving piece 50 and connected to the moving piece 50 can also be securely held. Here, it is more preferable that the engaging tongues 52 can move smoothly within the guide member 56. Therefore, a rail-like protrusion 54 is formed at the bottom of each engaging tongue 52 in this embodiment. The protrusions 54 may be formed on the guide member 56, instead of on the engaging tongues 52.

Figure 22:
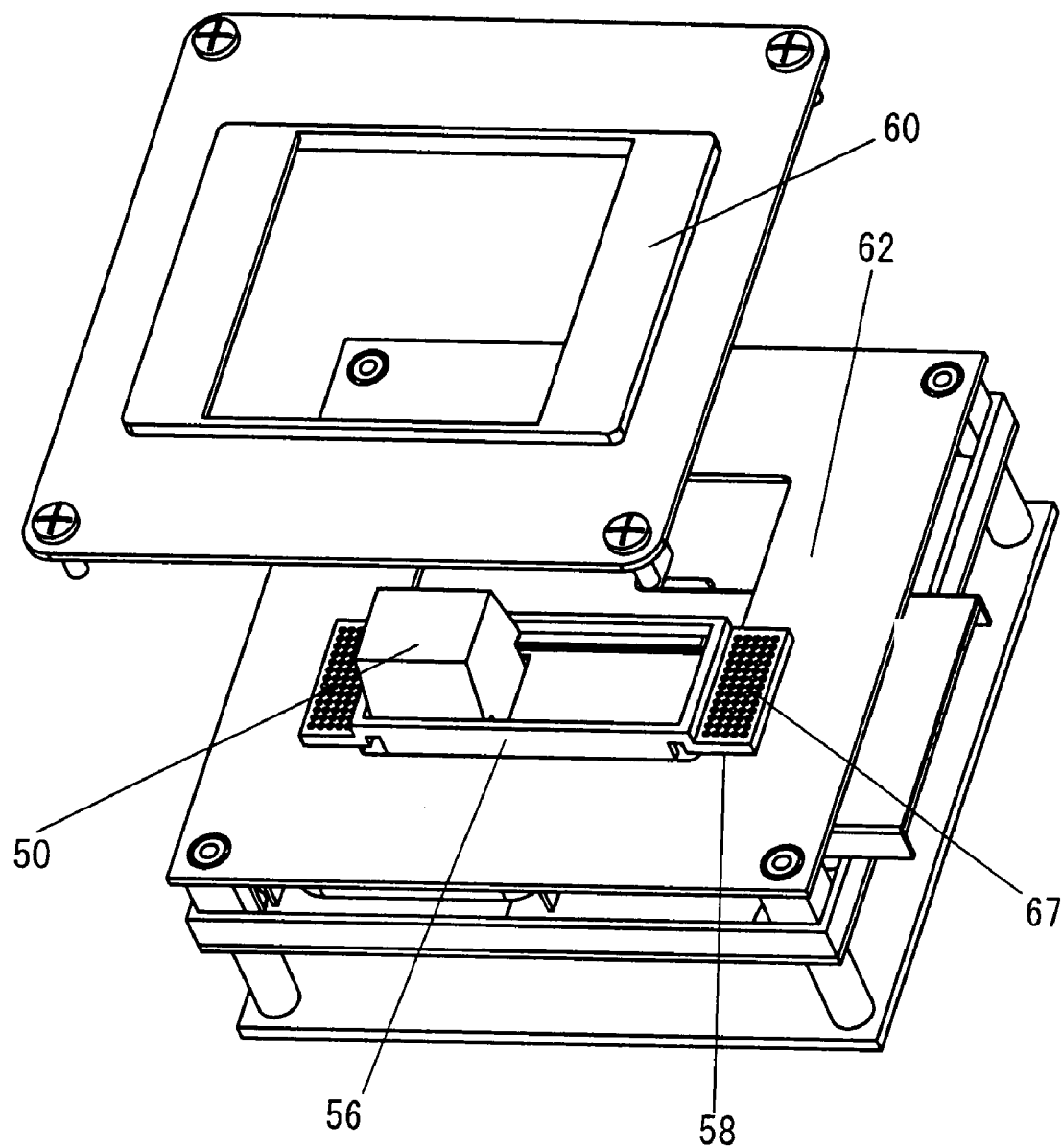
FIG. 22 is an exploded perspective view of an actuator of a tenth embodiment of the present invention.

FIG. 22 is an exploded perspective view of an actuator that is a tenth embodiment of the present invention. This embodiment is also a modification of the eighth and ninth embodiments, and is characterized in that the protrusions on the end parts 58 of the guide member 56 are replaced with concave parts. In this embodiment, concave parts 67 are scatteringly formed on the upper surfaces of the end parts 58. With the concave parts 67, it is also possible to achieve a structure in which the guide member 56 smoothly moves and reduces friction. It is more preferable to form the concave parts 67 also on the lower surfaces of the end parts 58.

It is also possible to form concave parts 67 on the lower surface of the upper guide plate 60 and the upper surface of the lower guide plate 62, instead of on the upper and lower surfaces of the end parts 58. Further, it is also possible to form the concave parts 67 on the lower surface of the upper guide plate 60 and the upper surface of the lower guide plate 62 as well as on the upper and lower surfaces of the end parts 58.

Figure 23A:
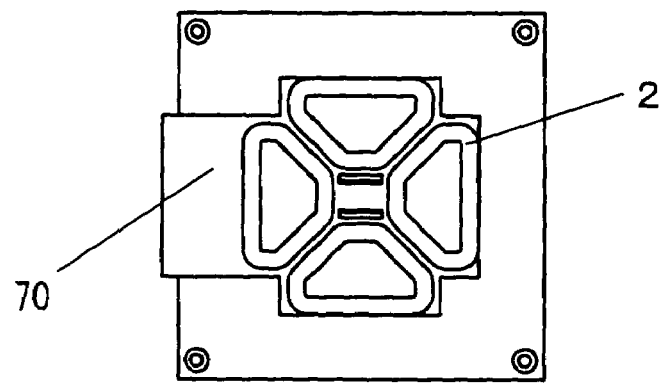
FIGS. 23A through 23C illustrate an eleventh embodiment of the present invention, where the board to which the coils are secured is improved.
Figure 23B:
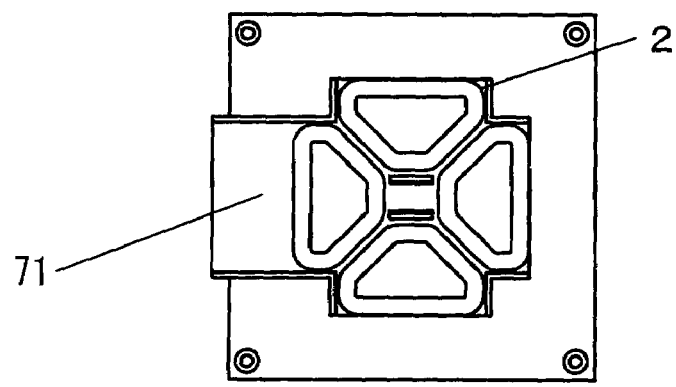
Figure 23C:
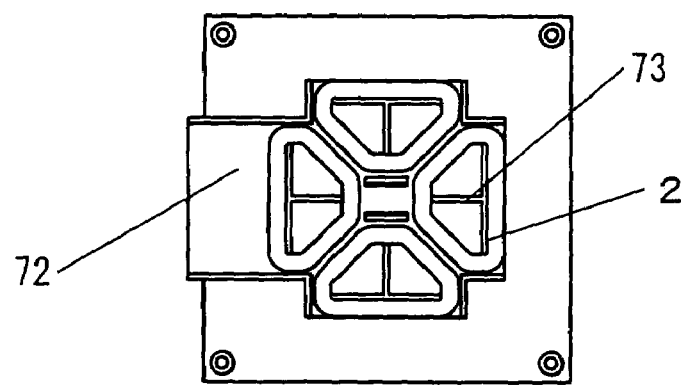

FIGS. 23A through 23C illustrate an eleventh embodiment of the present invention, in which the board that secures the coils 2 is improved. FIGS. 23A through 23C each shows an example of a board that can be employed in the actuator of this embodiment.

FIG. 23A illustrates a structure in which a board 70 is integrally formed with a slider. This is a simple structure in which the coils 2 are simply bonded to the board 70. Accordingly, the production costs can be reduced, and work efficiency in the production procedures can be increased. FIG. 23B illustrates a preferable structure in which coils are bonded to a board. In this structure, the coils 2 are bonded to a board 71, and wiring is arranged in the board 71. With this structure, the production costs can be reduced, and work efficiency in the production procedures can be increased. FIG. 23C illustrates another preferable structure in which the coils 2 are bonded to a board 72, and ribs 73 for securing the coils 2 are also inserted into holes formed in the board 72. With this structure, the coils 2 are surely secured. This embodiment and the embodiments that will be described later can be applied not only to actuators without a shaft, such as the actuator of the eighth embodiment, but also to actuators with shafts, such as the actuator of the first embodiment.

FIGS. 24A through 24D illustrate a twelfth embodiment of the present invention, in which impact force and impact noise caused when the moving piece reaches an end of the slidable range can be reduced. FIGS. 24A through 24D each shows a specific example of such a structure. This embodiment employs the slidable moving piece 50, the guide member 56, the upper guide plate 60, and the lower guide plate 62 of the eighth embodiment.

Figure 24A:
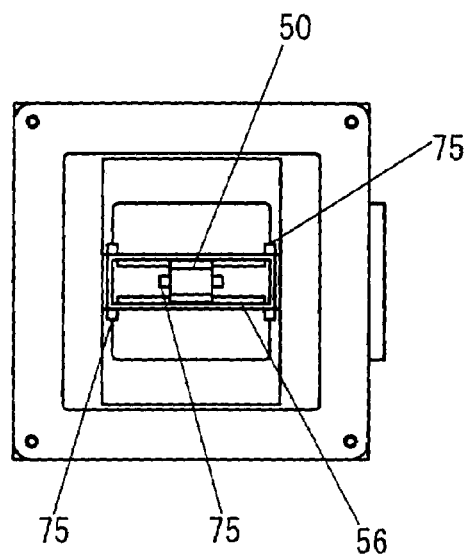
FIGS. 24A through 24D illustrate a twelfth embodiment of the present invention, in which adverse influence from impact force and impact noise is reduced.
Figure 24B:
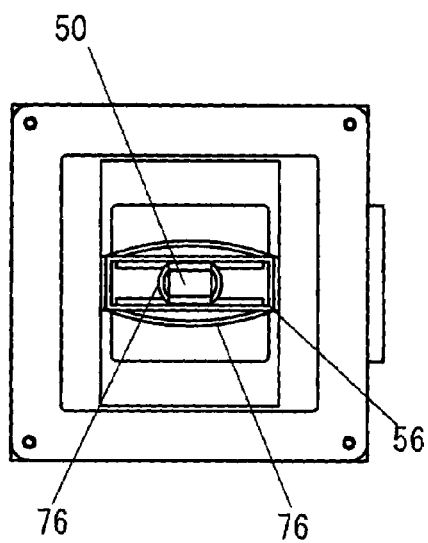
Figure 24C:
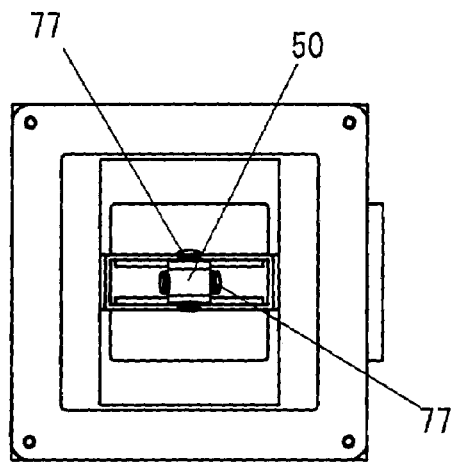
Figure 24D:
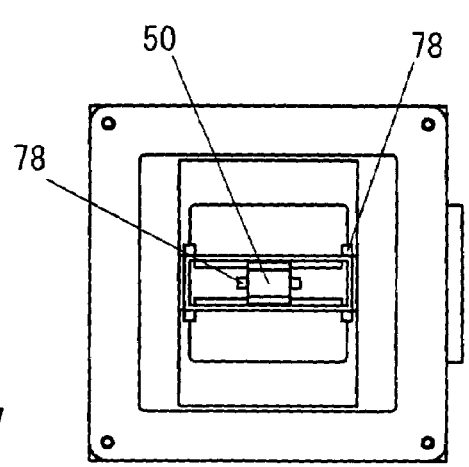

FIG. 24A shows a structure in which protrusions 75 are provided so as to reduce the impact areas in the direction of guiding the moving piece 50 and in the direction of guiding the guide member 56. As the protrusions 75 are formed when the moving piece 50 and the guide member 56 are molded, this structure can be easily produced. Here, it is preferable to employ parts that can be elastically deformed at the impact points. FIG. 24B shows a structure in which plate springs 76 are employed. FIG. 24C shows a structure in which coil springs 77 are employed. FIG. 24D shows a structure in which impact absorption parts 78 made of rubber or sponge are employed. With any of these structures, impact force caused by a collision of the moving piece 50 can be reduced, and impact noise can be eliminated.

Figure 25A:
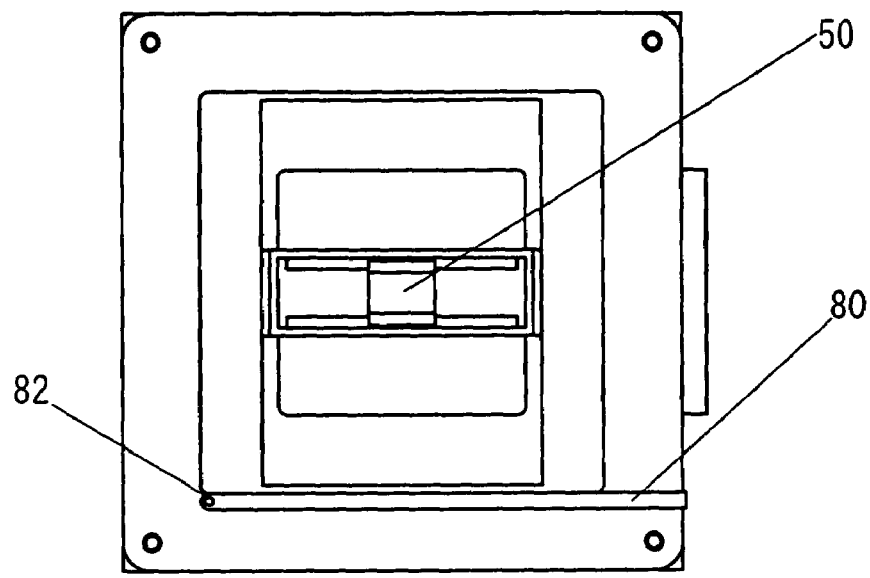
FIGS. 25A and 25B illustrate an actuator of a thirteenth embodiment of the present invention equipped with a mechanism that stands by when not being used.
Figure 25B:
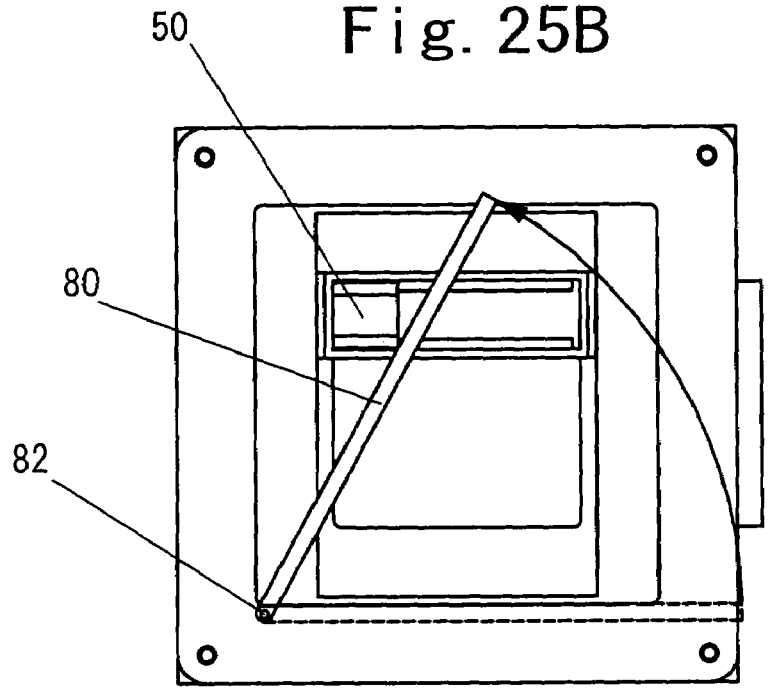

FIGS. 25A and 25B illustrate an actuator that is a thirteenth embodiment of the present invention. This actuator is equipped with a mechanism that stands by when not being used. FIG. 25A is a plan view of the actuator that is being used. FIG. 25B is a plan view of the actuator that is not being used and stands by. This embodiment can also be applied to an actuator without a shaft, such as the actuator of the eighth embodiment.

This actuator includes a stick-like member 80 that can rotate about a rotation shaft 82. The stick-like member 80 is retracted to such a position that is not obstructive to the operation when the actuator is being used, as shown in FIG. 25A. When the actuator is not being used, on the other hand, the stick-like member 80 is rotated about the rotation shaft 82, so that the stick-like member 80 is brought into contact with the moving piece 50 and holds the upper right end of the moving piece 50. With the actuator having the stand-by mechanism of this embodiment, the moving piece 50 and the slider connected to the moving piece 50 can be stably held in a predetermined position.

Figure 26A:
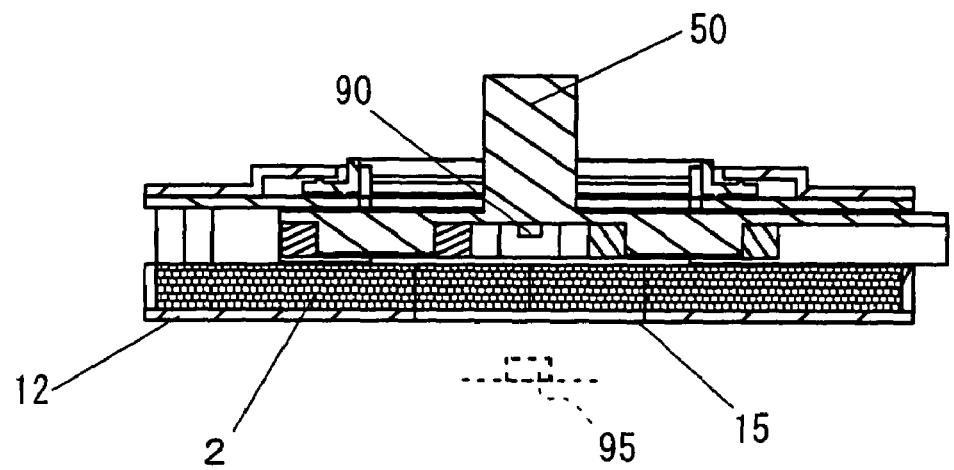
FIGS. 26A and 26B illustrate an actuator of a fourteenth embodiment of the present invention that has a preferable structure for application to a device such as a mouse.
Figure 26B:
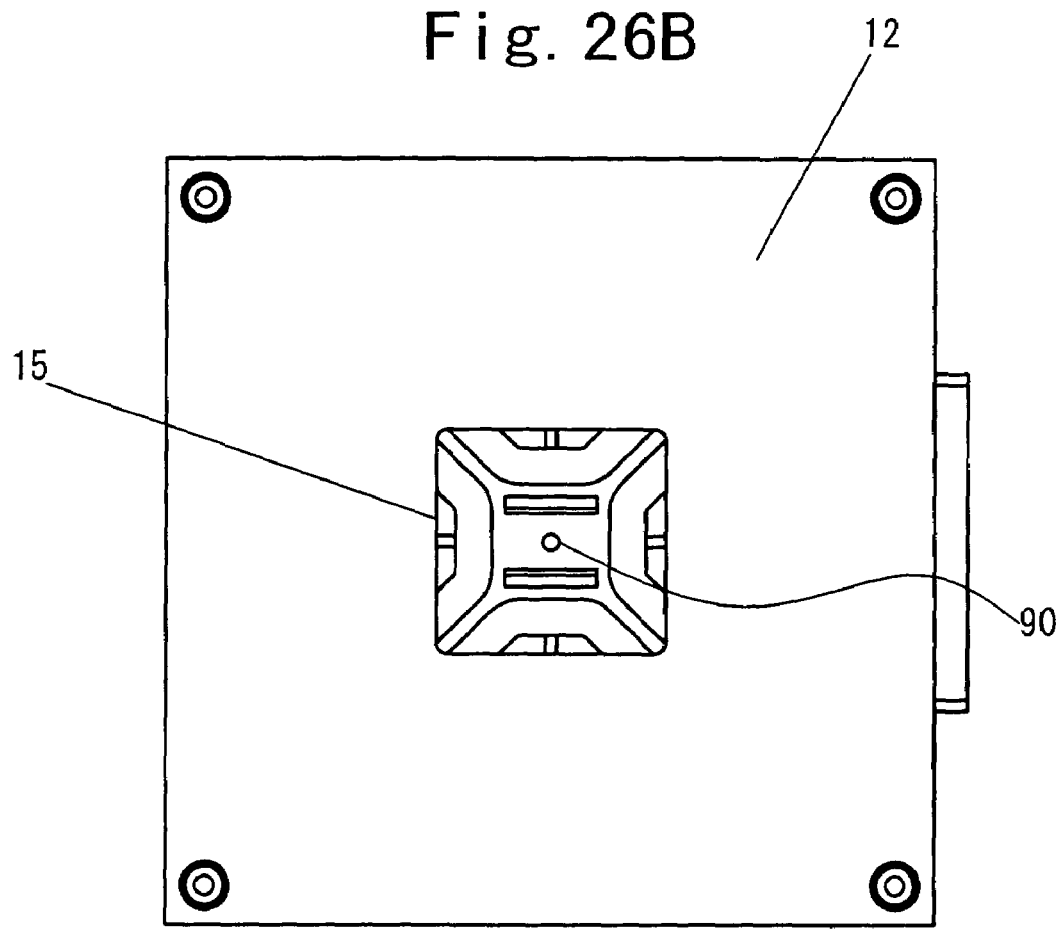

FIGS. 26A and 26B illustrate an actuator that is a fourteenth embodiment of the present invention. This actuator has a structure that can be suitably applied to a device such as a mouse. FIG. 26A is a vertical section view of this actuator, and FIG. 26B is a bottom view of this actuator. Since this actuator is to be incorporated into a device such as a mouse, a LED 90 is provided for detecting the locations of the moving piece 50 and the coils 2. In a case where this actuator is incorporated into a mouse, light emitted from the LED 90 through the opening 15 is detected by a photodetector (PD) 95 that is located outside the actuator.

If the light emitted from the LED 90 is diffusedly reflected by the surfaces of the magnets 1, the detection accuracy of the PD 95 decreases. To avoid the diffused reflection, the side surfaces of the magnets 1 upon which the light emitted from the LED 90 impinges are coated with a black coating in this embodiment. An epoxy resin coating containing a black colorant is applied to the side surfaces of the magnets 1. It is more preferable to apply the black coating to the coils 2 as well.

FIGS. 27A through 27D illustrate a microrelay of a fifteenth embodiment of the present invention. This microrelay is equipped with another structure that is suitable for a device such as a mouse. In FIGS. 27A through 27D, the coils and the parts surrounding the coils are shown. The fourteenth embodiment shown in FIGS. 26A and 26B employs the LED 90 and the PD 95 for detecting the locations of the moving piece 50 and the coils 2. In this embodiment, on the other hand, Hall devices that are magnetoelectric conversion devices are employed for detecting the locations of the moving piece 50 and the coils 2.

Figures 27A, 27B, 27C:
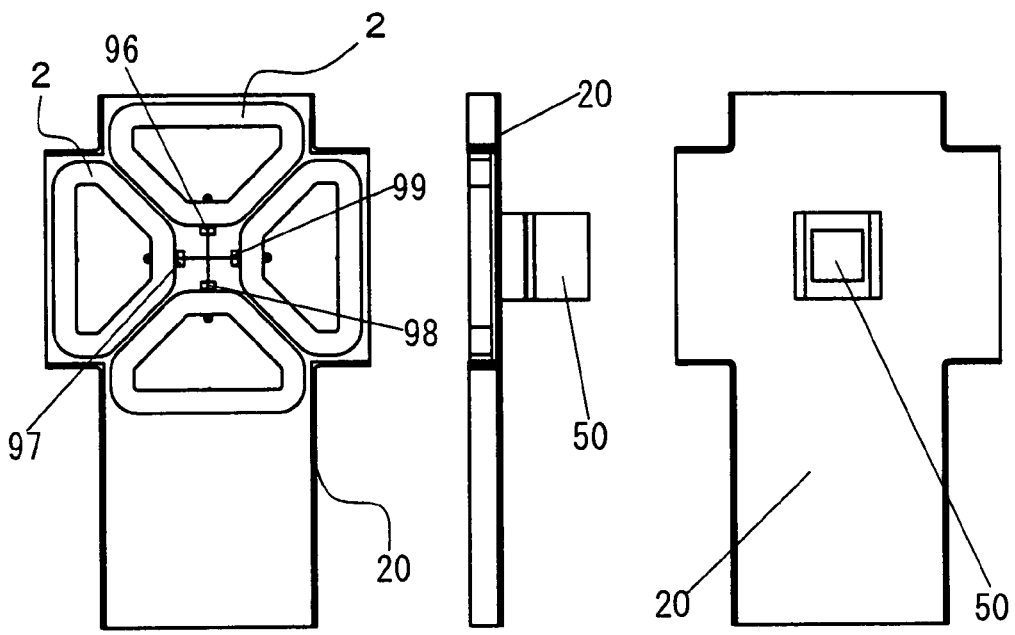
FIGS. 27A through 27D illustrate a microrelay of a fifteenth embodiment of the present invention that has another preferable structure for application to a device such as a mouse.
Figure 27D:
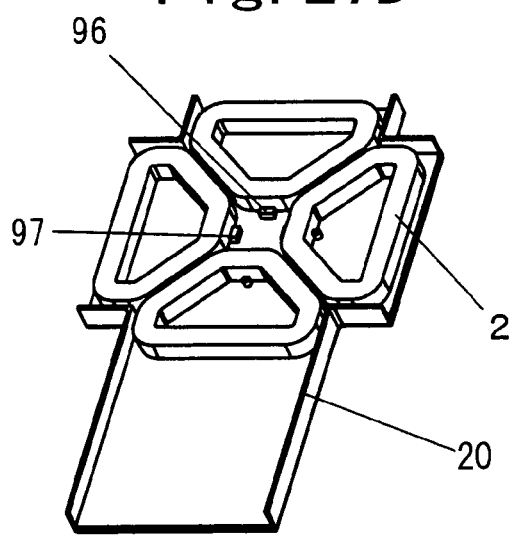

FIG. 27A is an enlarged view of the slider 20 seen from the coils 2. FIG. 27B is a right side view of the slider 20. FIG. 27C is a back view of the slider 20. FIG. 27D is a perspective view of the slider 20. As can be seen from FIG. 27A, four Hall devices 96 through 99 are arranged along the four coils 2. The Hall devices 96 and 98 are arranged on the line extending in the longitudinal direction of the slider 20. The Hall devices 97 and 99 are arranged on the line perpendicular to the longitudinal-direction line. In other words, the Hall devices 96 through 99 are arranged in the moving directions of the moving piece 50.

Although not shown in FIGS. 27A through 27D, the coils 2 face the magnets 1, which is the same arrangement as that in the foregoing embodiments. When the slider 20 of this structure is moved against the magnets 1, the Hall devices 96 through 99 can detect the voltage from the movement. Accordingly, like the case of the fourteenth embodiment, the structure of this embodiment can be suitably incorporated into a device such as a mouse, as the locations of the moving piece 50 and the coils 2 can be accurately detected.

Figure 28A:
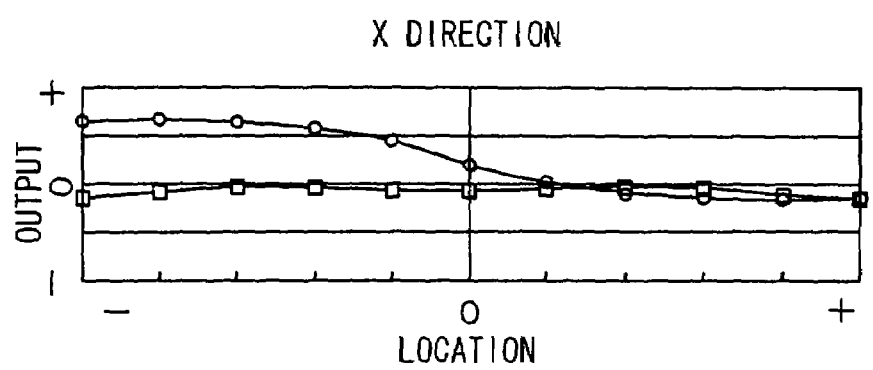
FIGS. 28A and 28B illustrate output conditions of the actuator of the fifteenth embodiment having the structure shown in FIGS. 27A through 27D, with the moving piece being moved.
Figure 28B:
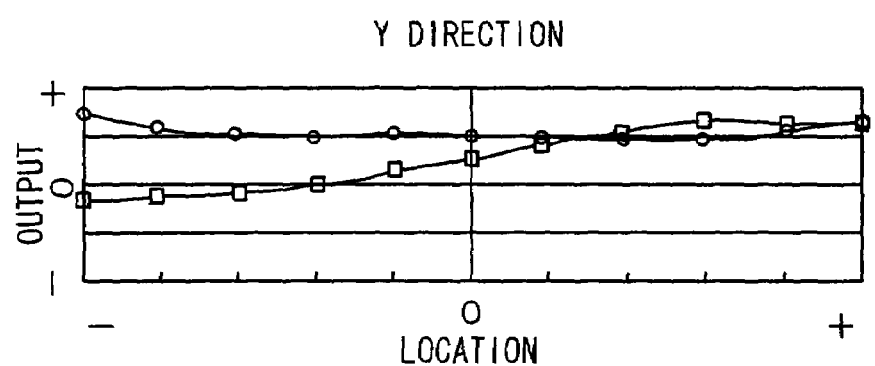

FIGS. 28A and 28B illustrate the output conditions in cases where the moving piece 50 of the actuator of the fifteenth embodiment shown in FIGS. 27A through 27D is moved. FIG. 28A shows the output conditions in a case where the moving piece 50 is moved in the X-direction (i.e., in the direction of the Hall devices 97 and 99). FIG. 28B shows the output conditions in a case where the moving piece 50 is moved in the Y-direction (i.e., in the direction of the Hall devices 96 and 98). As can be seen from these drawings, the Hall devices can efficiently detect the locations of the moving piece 50 and the coils 2. Here, the Hall devices may be replaced with magneto-resistive devices.

Figure 29:
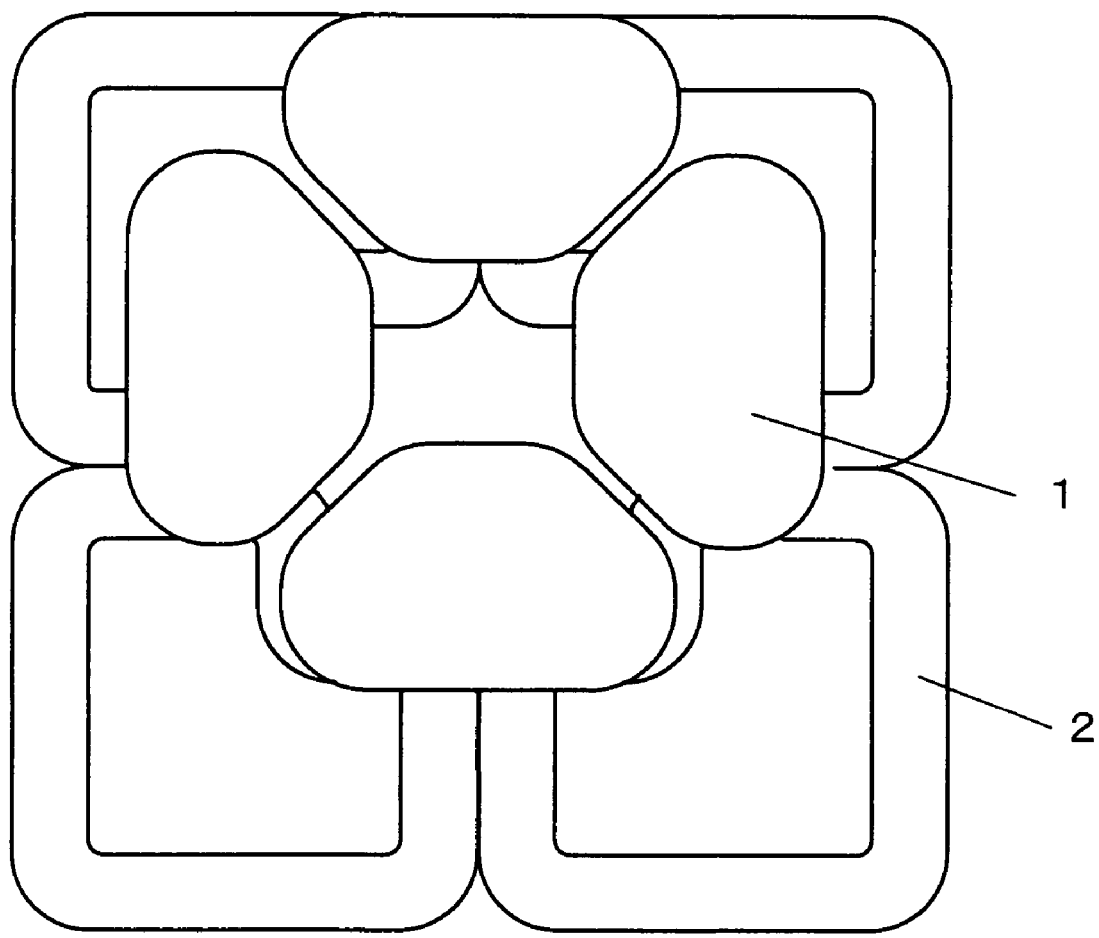
FIG. 29 illustrates a structure in which the coils are secured and the magnets are moved.
Figure 30:
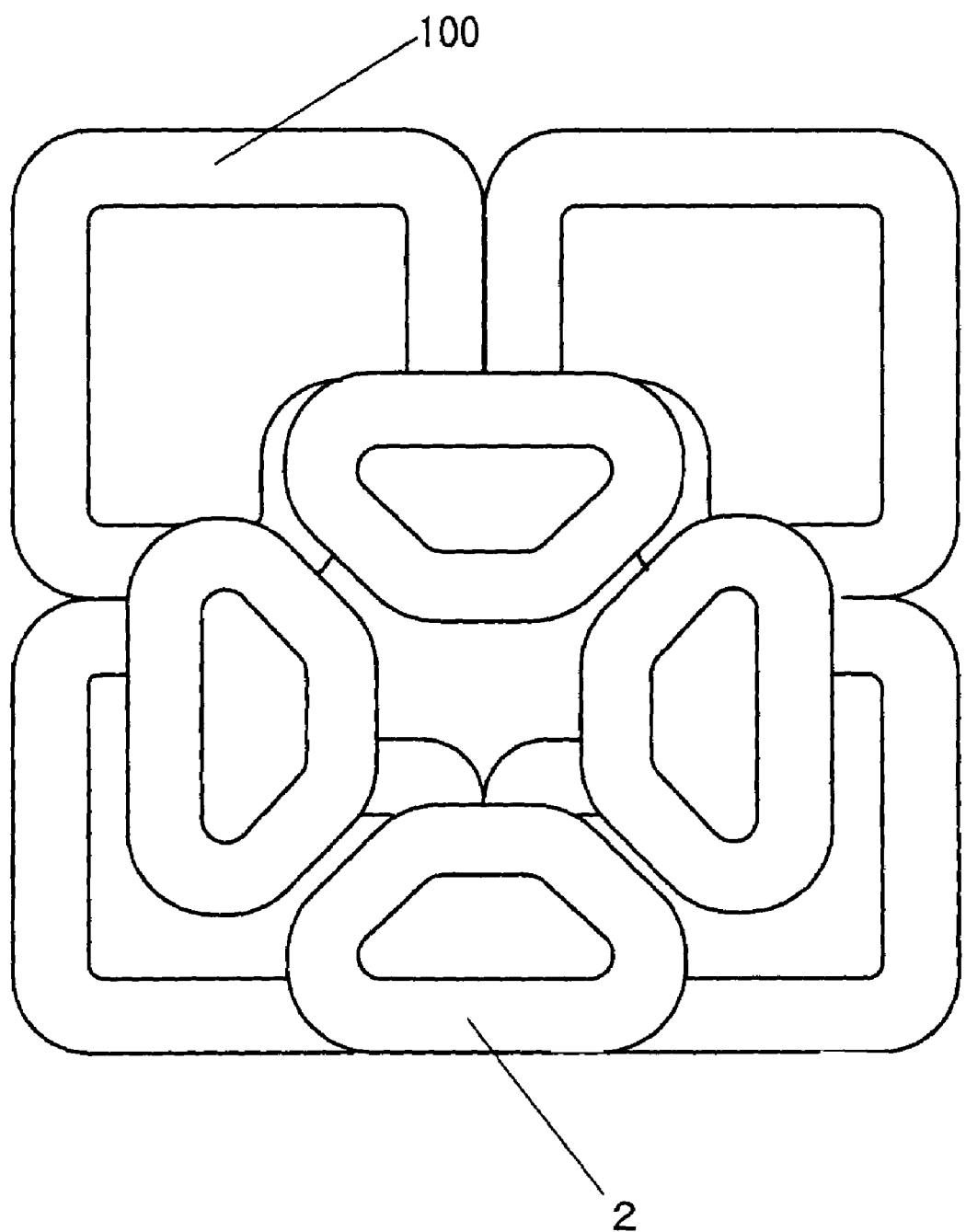
FIG. 30 illustrates a structure in which electromagnets are employed as the magnets.

FIGS. 29 and 30 illustrate the magnets 1 and the coils 2 that are commonly employed in the actuators of the foregoing embodiments. The magnets 1 are secured while the coils 2 are moved in the foregoing embodiments. However, the coils 2 may be secured while the magnets 1 are moved, as shown in FIG. 29. In the structure shown in FIG. 29, the slider and the moving piece are connected to the magnets 1. FIG. 5B shows an actuator to which the coils (2) are secured to the actuator while the magnets (1) are connected to the slider and the moving piece for movement.

The magnets 1 employed in the foregoing embodiments are permanent magnets produced through sintering or the like. Instead, electromagnets 100 that are formed by winding coils may be employed as the magnets 1 of an actuator of the present invention, as shown in FIG. 30. The electromagnets 100 are advantageous in generating no magnetic force when the actuator is not being used.

In each of the foregoing embodiments, the slider of the actuator is driven by supplying current to the coils, i.e., the actuator is passively driven upon receipt of a signal from an apparatus such as a computer. However, application of the actuator of the present invention is not limited to such an operation. An operator touches and moves the moving piece with his/her finger, so that current is generated in the coils by virtue of electromagnetic induction caused by the relative movement between the coils and the magnets facing the coils. With the current, the actuator can be used as an instruction input device for a computer. In this aspect, the actuator of the present invention is a novel actuator that can operate both passively and actively.

Also, the actuator of the present invention may be incorporated not only into a mouse, but also into other devices such as a vehicle, so that the flow of information, which is conventionally one-directional, can be two-directional or interactive.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An actuator comprising:
magnets arranged in a flat form;
coils facing the magnets;
a moving member connected to the coils;
a first holding member holding the moving member in such a manner that the moving member can slide within a predetermined range; and
a second holding member holding the first holding member in such a manner that the first holding member can slide within another predetermined range in a direction perpendicular to the sliding direction of the moving member,
the actuator moving the coils against the magnets.

2. An actuator comprising:
coils arranged in a flat form;
magnets facing the coils;
a moving member connected to the magnets;
a first holding member holding the moving member in such a manner that the moving member can slide within a predetermined range; and
a second holding member holding the first holding member in such a manner that the first holding member can slide within another predetermined range in a direction perpendicular to the sliding direction of the moving member, the actuator moving the magnets against the coils.

3. The actuator as claimed in claim 1, wherein the second holding member includes a pair of shafts that slidably supports the first holding member and are arranged at a distance from each other.

4. The actuator as claimed in claim 3, wherein the first holding member is molded in such a manner as to be in contact only with the lower sides of the pair of shafts.

5. The actuator as claimed in claim 1, wherein the second holding member includes a single shaft that slidably supports the first holding member and has a quadrangular section.

6. The actuator as claimed in claim 1, wherein the first holding member is a molded member defined by bending pressing a plate-like material.

7. The actuator as claimed in claim 1, wherein:
the moving member includes a moving piece that protrudes so that an operator can touch the moving piece; and
the moving piece is slidably engaged with a shaft formed in the first holding member.

8. An actuator comprising:
magnets arranged in a flat form;
coils facing the magnets;
a moving member connected to the coils;
a first guide member guiding the moving member in such a manner that the moving member can slide within a predetermined range; and
a second guide member guiding the first guide member in such a manner that the first guide member can slide within another predetermined range in a direction perpendicular to the sliding direction of the moving member,
the actuator moving the coils against the magnets.

9. An actuator comprising:
coils arranged in a flat form;
magnets facing the coils;
a moving member connected to the magnets;
a first guide member guiding the moving member in such a manner that the moving member can slide within a predetermined range; and
a second guide member that guiding the first guide member in such a manner that the first guide member can slide within another predetermined range in a direction perpendicular to the sliding direction of the moving member,
the actuator moving the magnets against the coils.

10. The actuator as claimed in claim 8, wherein:
the moving member has a moving piece that protrudes so that an operator can touch the moving piece; and
the moving piece has engaging tongues that are to be engaged with the first guide member and prevent the moving piece from coming off.

11. The actuator as claimed in claim 8, wherein at least one of the first guide member and the second guide member has protrusions formed on a sliding surface thereof.

12. The actuator as claimed in claim 11, wherein the protrusions are rail-like protrusions that extend in a sliding direction.

13. The actuator as claimed in claim 11, wherein the protrusions are hemispheric protrusions that are scatteringly formed on the sliding surface.

14. The actuator as claimed in claim 8, wherein at least one of the first guide member and the second guide member has concavities on a sliding surface thereof.

15. The actuator as claimed in claim 1, further comprising impact reducing members for reducing impact force caused when the moving member reaches an end.

16. The actuator as claimed in claim 15, wherein the impact reducing members are protrusions formed on at least one of the first holding member and the second holding member.

17. The actuator as claimed in claim 15, wherein the impact reducing members are protrusions formed on at least one of the first guide member and the second guide member.

18. The actuator as claimed in claim 15, wherein the impact reducing members are plate springs or coil springs provided on at least one of the first holding member and the second holding member.

19. The actuator as claimed in claim 15, wherein the impact reducing members are plate springs or coil springs provided on at least one of the first guide member and the second guide member.

20. The actuator as claimed in claim 1, further comprising a board to which the coils are secured,
wherein the board is secured by engaging claws formed on the moving member.

21. The actuator as claimed in claim 1, wherein the magnets are integrally formed with spacers by molding a magnetic material.

22. The actuator as claimed in claim 1 further comprising a resin board to which the coils are secured,
wherein the coils are insert-molded with the resin board and thus secured to the resin board.

23. The actuator as claimed in claim 1, further comprising a board that is integrally molded with the moving member.

24. The actuator as claimed in claim 1, further comprising a resin board to which the coils are secured,
wherein the resin board has ribs for positioning and securing the coils.

25. The actuator as claimed in claim 1, wherein:
the moving member has a moving piece that protrudes so that an operator can touch the moving piece; and
the actuator further comprises a stand-by mechanism that moves the moving piece to a stand-by position when the moving piece is not used.

26. The actuator as claimed in claim 25, wherein the stand-by mechanism includes a stick-like member that presses and holds the moving piece to the stand-by position.

27. The actuator as claimed in claim 1, wherein the coils are coated with a black coating.

28. The actuator as claimed in claim 1, wherein the magnets have surfaces subjected to a blackening process.

29. The actuator as claimed in claim 28, wherein the blackening process includes application of an epoxy resin material that contains a black colorant.

30. The actuator as claimed in claim 1, further comprising magnetoelectric conversion devices that detect a movement of the coils moving against the magnets.

31. The actuator as claimed in claim 1, wherein the magnets are permanent magnets or electromagnets.

32. An actuator, comprising:
a set of magnets and a set of coils, one set arranged in a flat form and the other set facing the one set;
a moving member connected to one of the set of magnets and the set of coils;
a first member controlling the moving member to move within a predetermined range;
a second member controlling the first member to move within another predetermined range in a second direction, perpendicular to the first direction; and
the actuator moving one of the set of the coils and the set of magnets relatively to the other of the set of coils and the set of magnets.

33. An actuator, comprising:
a set of magnets and a set of coils arranged in mutually facing relationship and movable relatively to each other;
a moving member connected to a selected one of the set of magnets and the set of coils;
a first direction control member controlling the moving member to move within a predetermined range in a first direction;
a second direction control member controlling the first direction control member to move within a second predetermined range in a second direction, perpendicular to the first direction; and
the actuator moving one of the set of the coils and the set of magnets relatively to the other of the set of coils and the set of magnets.

* * * * *

UNITED STATES PATENT AND TRADEMARK OFFICE
CERTIFICATE OF CORRECTION

| | |
|---|---|
| PATENT NO. | : 6,982,618 B2 |
| APPLICATION NO. | : 10/625727 |
| DATED | : January 3, 2006 |
| INVENTOR(S) | : Shinichiro Akieda et al. |

It is certified that error appears in the above-identified patent and that said Letters Patent is hereby corrected as shown below:

<u>Title page,</u>
Item [56], References Cited, U.S. PATENT DOCUMENTS, delete "200/6 A" and insert -- 200/6A --.

<u>Column 12,</u>
Line 44, after "member" delete "that".

Signed and Sealed this

Fourth Day of July, 2006

JON W. DUDAS
*Director of the United States Patent and Trademark Office*